(12) United States Patent
Kamiya

(10) Patent No.: US 6,443,534 B2
(45) Date of Patent: Sep. 3, 2002

(54) BRAKE SYSTEM HAVING BRAKE ASSIST FEATURE

(75) Inventor: Masahiko Kamiya, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/741,877

(22) Filed: Dec. 22, 2000

(30) Foreign Application Priority Data

Dec. 24, 1999 (JP) ............................. 11-366259
Sep. 1, 2000 (JP) ........................ 2000-265583

(51) Int. Cl.$^7$ ................................ B60T 8/00; B60T 8/32
(52) U.S. Cl. ............................... 303/113.5; 303/113.3; 303/116.1
(58) Field of Search .................. 303/87, 113.1, 303/113.2, 113.5, 116.1, 116.2, 139, 146

(56) References Cited

U.S. PATENT DOCUMENTS

| | | | | |
|---|---|---|---|---|
| 5,590,936 A | * | 1/1997 | Reuter | 303/116.1 |
| 5,967,626 A | * | 10/1999 | Terao et al. | 303/116.2 |
| 5,967,628 A | * | 10/1999 | Abe et al. | 303/122.12 |
| 6,196,643 B1 | * | 3/2001 | Yokohama et al. | 303/166 |
| 6,231,132 B1 | * | 5/2001 | Watanabe | 303/116.2 |
| 6,238,019 B1 | | 5/2001 | Okazaki et al. | |

FOREIGN PATENT DOCUMENTS

| | | |
|---|---|---|
| JP | 11-20647 | 1/1999 |
| JP | 11-108230 | 4/1999 |
| JP | 2000-71967 | 3/2000 |

* cited by examiner

*Primary Examiner*—Christopher P. Schwartz
(74) *Attorney, Agent, or Firm*—Harness, Dickey & Pierce, PLC

(57) ABSTRACT

A brake system includes first brake assist means arranged in a first brake circuit to increase a first wheel cylinder pressure to a level higher than a master cylinder pressure. The brake system further includes second brake assist means arranged in a second brake circuit to increase a second wheel cylinder pressure to a level higher than the master cylinder pressure. The second brake assist means includes a brake regulator mechanism that uses the increased first wheel cylinder pressure as a pilot pressure and adjusts the increased second wheel cylinder pressure to a pressure falling within a predetermined range from the increased first wheel cylinder pressure when the first brake assist means is activated.

18 Claims, 13 Drawing Sheets

BRAKE SYSTEM HAVING BRAKE ASSIST FEATURE

CROSS REFERENCE TO RELATED APPLICATION

This application is based on and incorporates herein by reference Japanese Patent Application No. 11-366259 filed on Dec. 24, 1999 and Japanese Patent Application No. 2000-265583 filed on Sep. 1, 2000.

BACKGROUND OF THE INVENTION

The present invention relates to a brake system that has a brake assist feature implemented in brake circuits and activated during sudden or panic braking.

For example, Japanese Unexamined Patent Publication No. 11-108230 discloses such a brake system. This brake system has a couple of brake circuits, one for a pair of vehicle wheels and one for another pair of vehicle wheels. The brake assist feature is implemented in the brake circuits by a couple of pumps (one for each brake circuit) and a couple of differential pressure retaining valves (one for each brake circuit).

In the above-described brake system, if a discharge capacity differs between the pumps, or if differential pressure retaining ability differs between the differential pressure retaining valves, a second brake fluid pressure, which is generated in each brake circuit and is higher than the master cylinder pressure, may differ between the brake circuits. For instance, the difference in the second brake fluid pressure can be created when a difference in resistance of electric lines provided for supplying electric power to each pump or differential pressure retaining valve exists between the brake circuits for some reasons. Furthermore, the difference in the second brake fluid pressure can also be created when a difference in pressure-sealing performance of the pump exists between the brake circuits due to, for example, aging.

The creation of the differential pressure between the brake circuits causes some problems. For instance, in a diagonally split brake system having one brake circuit for the right front wheel and the left rear wheel and one brake circuit for the left front wheel and the right rear wheel, it causes a difference in braking force between a left side and a right side of the vehicle. Furthermore, in a vertically split brake system having one brake circuit for the right front wheel and the left front wheel and one brake circuit for the right rear wheel and the left rear wheel, it causes a difference in braking force between a front side and a rear side of the vehicle.

The difference (unbalance) in the braking force can be particularly large in the vehicles having the brake assist feature. That is, during panic braking, during malfunction of a brake booster or during the operation beyond a dead point of the brake booster, when the wheel cylinder pressure greater than the master cylinder pressure is generated in the brake lines and is supplied to each wheel, the wheel cylinder pressure supplied to each wheel may have no relationship or a relatively smaller degree of relationship with the master cylinder pressure. Thus, a difference in brake fluid pressure between the wheels or between the brake circuits cannot be substantially compensated. Furthermore, since the high brake fluid pressure supplied to each wheel is greater than the master cylinder pressure, the difference in the brake fluid pressure that causes the above-described difference in the braking force may be increased.

SUMMARY OF THE INVENTION

The present invention addresses the above-described disadvantages. Therefore, it is an objective of the present invention to provide a brake system having a brake assist feature implemented in brake circuits and being capable of compensating a difference in brake fluid pressure between the brake circuits and thereby keeping the difference in the brake fluid pressure between the brake circuits to be less than or equal to a predetermined amount to assure a sufficient stability of vehicle motion during braking aided by the brake assist. In a case of vertically split brake system, the difference in the brake fluid pressure between a front wheel brake circuit and a rear wheel brake circuit should remain less than a predetermined amount to maintain a predetermined brake force allocation between the front wheels and the rear wheels.

To achieve the objective of the present invention, there is provided a brake system for a vehicle having a master cylinder, first and second wheel cylinders, a first brake circuit, third and fourth wheel cylinders, a second brake circuit, first brake assist means and second brake assist means. The master cylinder has first and second chambers in each of which a master cylinder pressure is generated in response to brake operation by a vehicle driver. The first and second wheel cylinders are provided for exerting a first braking force on first and second vehicle wheels, respectively, by a first wheel cylinder pressure generated based on the master cylinder pressure in the first chamber of the master cylinder. The first brake circuit connects the master cylinder to the first and second wheel cylinders. The third and fourth wheel cylinders are provided for exerting a second braking force on third and fourth vehicle wheels, respectively, by a second wheel cylinder pressure generated based on the master cylinder pressure in the second chamber of the master cylinder. The second brake circuit is provided for connecting the master cylinder to the third and fourth wheel cylinders. The first brake assist means is arranged in the first brake circuit to increase the first wheel cylinder pressure to a level higher than the master cylinder pressure in the first chamber and to conduct the increased first wheel cylinder pressure to at least one of the first and second wheel cylinders in response to at least one of a state of the brake operation by the vehicle driver and a braking state of the vehicle. The second brake assist means is arranged in the second brake circuit to increase the second wheel cylinder pressure to a level higher than the master cylinder pressure in the second chamber and to conduct the increased second wheel cylinder pressure to at least one of the third and fourth wheel cylinders in response to at least one of the state of the brake operation by the vehicle driver and the braking state of the vehicle. The second brake assist means includes a brake regulator mechanism that uses the increased first wheel cylinder pressure as a pilot pressure and adjusts the increased second wheel cylinder pressure in the third and fourth wheel cylinders to a pressure falling within a predetermined range from the increased first wheel cylinder pressure in the first and second wheel cylinders when the first brake assist means is activated.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF THE INVENTION

Figure 1:
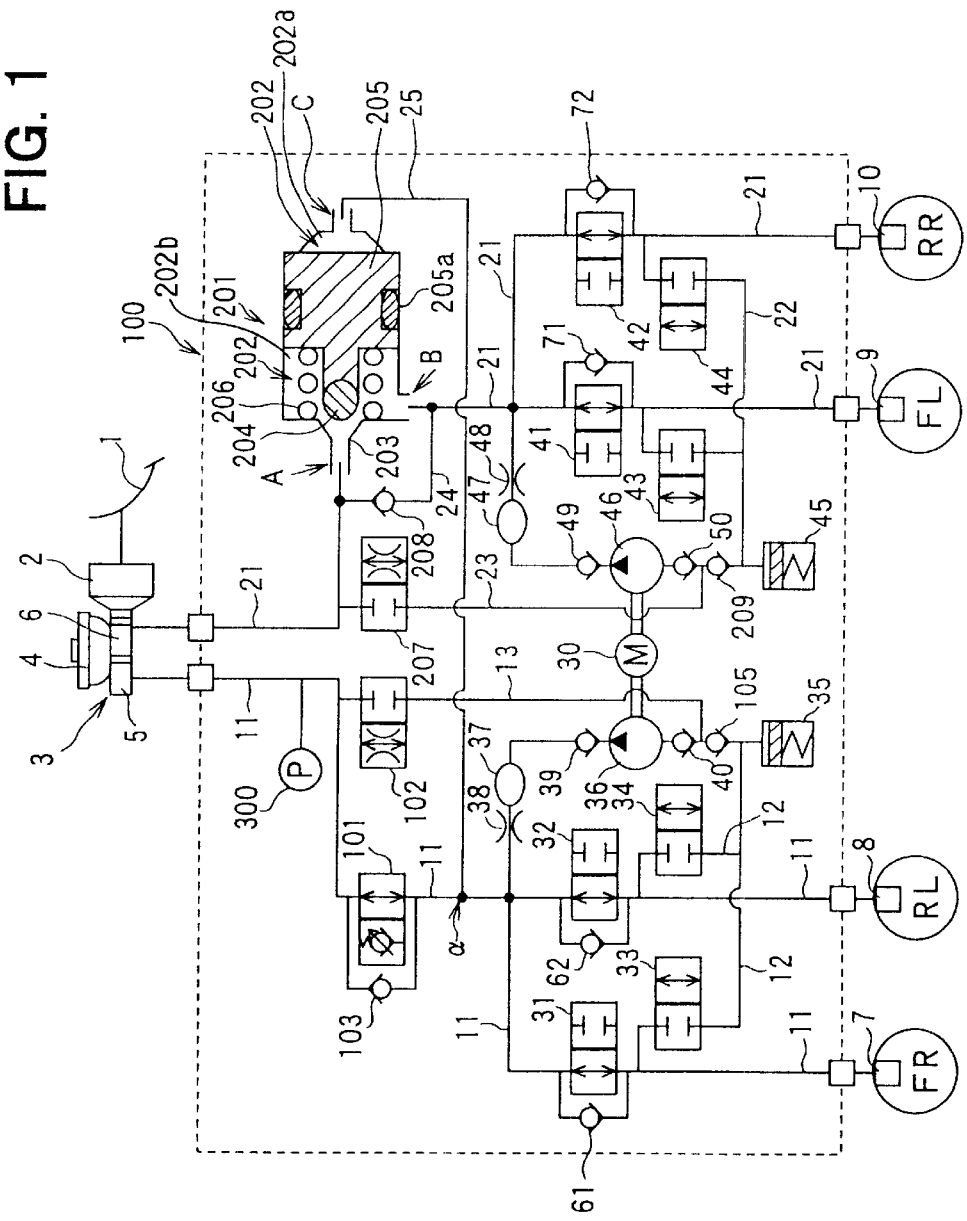
FIG. 1 is a schematic view of a brake system according to a first embodiment of the present invention.

A brake system according to a first embodiment of the present invention will now be described with reference to FIG. 1. A booster 2 is connected to a brake pedal 1 via a rod. When the brake pedal 1 is depressed by a vehicle driver, the booster 2 multiplies a force applied on the brake pedal 1 with the aid of a negative pressure developed in an intake manifold of an engine and transmits the multiplied force to a master cylinder 3 until the negative pressure in the intake manifold reaches a dead point negative pressure. Primary and secondary chambers 6, 5 are arranged in the master cylinder 3 and are fluid-tightly separated from each other by pistons. The primary and secondary chambers 6, 5 are connected to a master cylinder reservoir 4 through a center valve (not shown).

Furthermore, the primary and secondary chambers 6, 5 are connected to corresponding vehicle wheels (a right front wheel FR, a left front wheel FL, a right rear wheel RR and a left rear wheel RL) through a brake line system 100.

The brake line system 100 includes first and second brake circuits 11, 21. The first brake circuit 11 connects the secondary chamber 5 to a wheel cylinder 7 of the right front wheel FR and a wheel cylinder 8 of the left rear wheel RL. The second brake circuit 21 connects the primary chamber 6 to a wheel cylinder 9 of the left front wheel FL and a wheel cylinder 10 of the right rear wheel RR.

In the first brake circuit 11, pressurization control valves 31, 32 are provided for the wheel cylinder 7 and the wheel cylinder 8, respectively, to increase and maintain the pressure within the corresponding wheel cylinders 7, 8 during anti-skid control. A depressurization pipeline 12 branches off between each of the pressurization control valves 31, 32 and a corresponding one of the wheel cylinders 7, 8. In the depressurization pipeline 12, depressurization control valves 33, 34 are provided to decrease and maintain the pressure within the corresponding wheel cylinders 7, 8 during the anti-skid control. The depressurization pipeline 12 is further connected to a reservoir 35. Brake fluid reserved in the reservoir 35 is suctioned by a pump 36 and is discharged into the first brake circuit 11 between the pressurization control valves 31, 32 and a linear differential pressure valve 101 (which will be described in great detail below) through a damper 37 and an orifice 38. The pump 36 is driven by a motor 30. The motor 30 also drives a pump 46 arranged in the second brake circuit 21. Check valves 40, 39 are inserted at a suction port and a discharge port of the pump 36, respectively.

The linear differential pressure valve 101 is inserted in the first brake circuit 11 between the secondary chamber 5 and the pressurization control valves 31, 32. The linear differential pressure valve 101 can adjust a differential pressure between the master cylinder side and the wheel cylinder side by varying the amount of restriction of the pipeline to vary the amount of the flow in consistent with the amount of electric power supplied to the linear differential pressure valve 101. A one way valve 103 is arranged in parallel with the linear differential pressure valve 101. The one way valve 103 allows flow of brake fluid only in the direction from the master cylinder side to the wheel cylinder side when a pressure within the secondary chamber 5 reaches a predetermined level.

A suction pipeline 13 branches off between the secondary chamber 5 and the linear differential pressure valve 101 and extends to the suction port of the pump 36. A suction valve 102, which is normally closed, is inserted in the suction pipeline 13. A check valve 105 is inserted between the suction port of the pump 36 and the reservoir 35 to prevent flow of the brake fluid from the master cylinder side to the reservoir 35 through the suction pipeline 13 during the brake assist operation. The prevention of the flow of the brake fluid to the reservoir 35 by the check valve 105 allows depressurization control of the wheel cylinder pressure during the anti-skid control that is conducted during the brake assist operation.

A hydraulic pressure sensor 300 is arranged between the secondary chamber 5 and the linear differential pressure valve 101 in the first brake circuit 11. The hydraulic pressure sensor 300 substantially measures a master cylinder pressure. That is, when the brake pedal is depressed, the same pressure is generated in each of the primary and secondary chambers 6, 5. The hydraulic pressure sensor 300 measures this pressure.

The above-described pressurization control valve 31, 32, the depressurization control valve 33, 34 and the suction valve 102 are two-position valves and are fixed in the position shown in FIG. 1 during a non-braking period and a normal braking period (i.e., a period during which the anti-skid control, the brake assist control or the like is not conducted) as well as during a de-energization period of these valves. The linear differential pressure valve 101 is also normally in a communicated state while it is not energized.

The second brake circuit 21 has a similar construction as that of the first brake circuit 11. Pressurization control valves 41, 42, depressurization control valves 43, 44, a depressurization pipeline 22, a reservoir 45, a pump 46, check valves 49, 50, 209, a suction pipeline 23, a suction valve 207, a damper 47 and an orifice 48 of the second brake circuit 21 correspond with and act like the pressurization control valves 31, 32, the depressurization control vales 33, 34, the depressurization pipeline 12, the reservoir 35, the pump 36, the check valves 39, 40, 105, the suction pipeline 13, the suction valve 102, the damper 37 and the orifice 38 of the first brake circuit 11, respectively.

A regulator valve 201 acting as a mechanical regulator mechanism is arranged in the second brake circuit 21 between the primary chamber 6 and a branch point where the second brake circuit 21 branches to the wheel cylinder 9 of the left front wheel FL and the wheel cylinder 10 of the right rear wheel RR. A one way valve 208 is arranged in parallel with the regulator valve 201. Similar to the one way valve 103 of the first brake circuit 11, the one way valve 208 can apply the master cylinder pressure to the wheel cylinders 9, 10 by bypassing the regulator valve 201, for example, when the vehicle driver depresses the brake pedal during the traction control.

The regulator valve 201 includes first to third port passages A, B, C communicated with an interior of a regulator chamber 202. The first port passage A receives the master cylinder pressure from the primary chamber 6. A valve seat 203 and a valve element 204 are arranged at the first port passage A side of the regulator chamber 202. A piston 205, to which the valve element 204 is secured by caulking, welding or the like, is urged toward the third port passage C by a spring 206.

The second port passage B is communicated to the first port passage A through the regulator chamber 202 while the valve element 204 is lifted from the valve seat 203. The second port passage B is communicated to the wheel cylinders 9, 10.

The third port passage C is communicated to a regulator pipeline 25. The regulator pipeline 25 is connected to the first brake circuit 11 at a connection point α between the linear differential pressure valve 101 and the pressurization control valves 31, 32 in the first brake circuit 11.

The piston 205 has a seal 205a for fluid-tightly separating a second side 202b (communicated with the first and second port passages A, B) of the regulator chamber 202 and a first side 202a (communicated with the third port passage C) of the regulator chamber 202.

Figure 2:
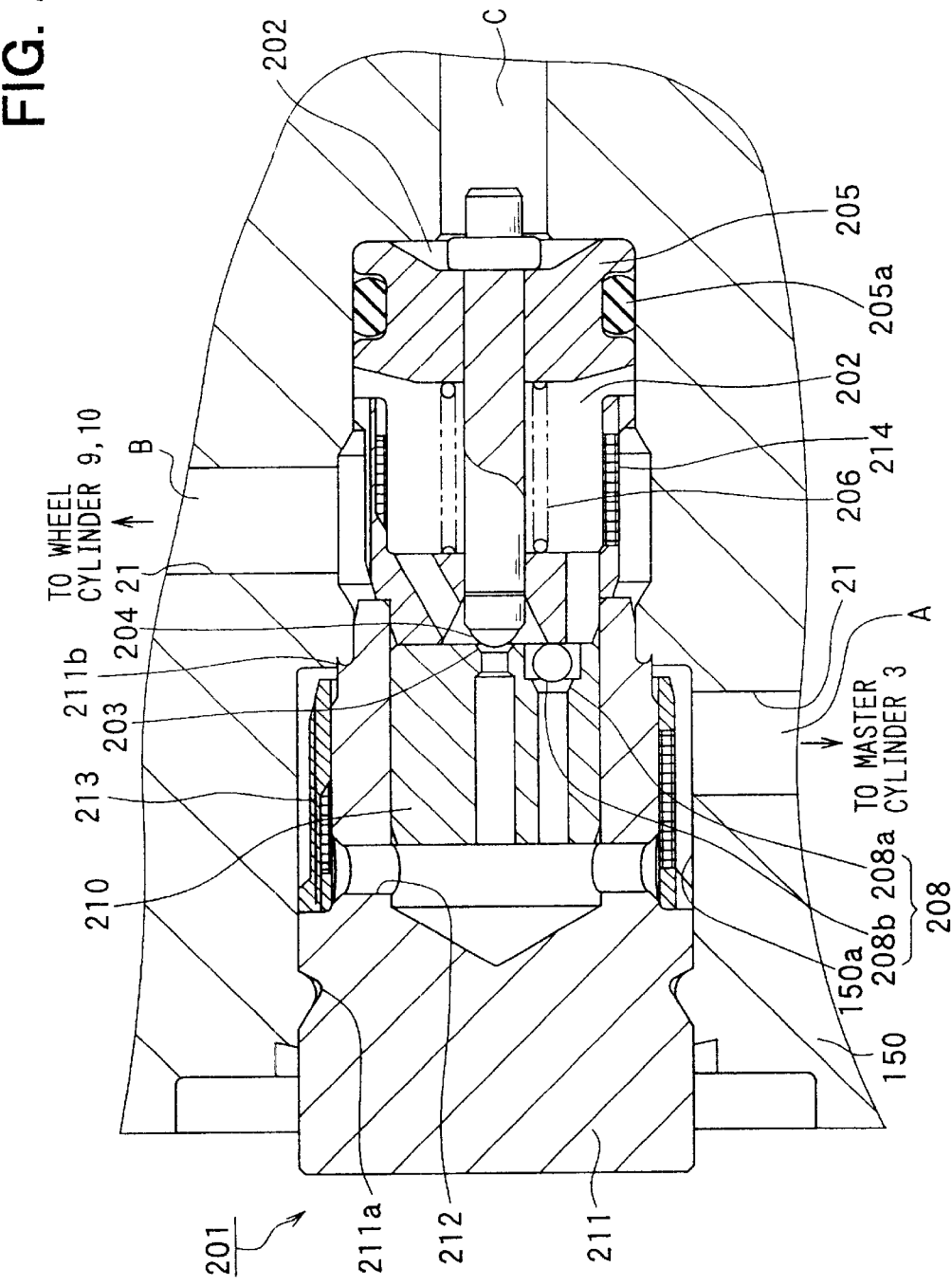
FIG. 2 is a partial longitudinal cross-sectional view of an exemplary regulator valve of the brake system shown in FIG. 1.

An exemplary structure of the regulator valve 201 is shown in FIG. 2. The above-described brake line system 100 is manufactured by forming pipelines in a housing 150 made, for example, of aluminum and then fitting various valves, reservoirs and the like to the housing 150. The regulator valve 201 is also fitted to the housing 150.

The regulator chamber 202 is formed by a recess 150a defined in the housing 150. The piston 205 and the seal 205a are arranged to slide along the inner side-wall surface of the regulator chamber 202 in the housing 150. The first and second port passages A, B are formed in the inner side-wall surface of the recess 150a, and the third port passage C is formed in a bottom-wall surface of the recess 150a.

The seat valve unit 210 including the valve seat 203 is arranged closer to the entry opening (left side of FIG. 2) of the recess 150a than the piston 205 and is secured to the housing 150 via a guide 211 having a hollow part. The seat valve unit 210 is press fitted into the hollow part of the guide 211 that is in turn secured to the housing 150 by caulking. With this arrangement, the seat valve unit 210 is secured to the housing 150 along with the guide 211. The guide 211 is caulked to the housing 150 at two points, i.e., at an outer peripheral part and a distal end step 211b of the guide 211. The caulking at the outer peripheral part of the guide 211 is achieved by caulking portion of the housing 150 to a channel 211a formed along the outer peripheral surface of the guide 211. The caulking at the outer peripheral part of the guide 211 secures the guide 211 to the housing 150 and seals the first port passage A from the exterior of the housing 150. Caulking of the distal end step 211b of the guide 211 to the housing 150 seals between the first port passage A and the second port passage B at the outer peripheral surface of the guide 211.

A communication passage 212 extends through the outer peripheral wall of the guide 211 to communicate the hollow part of the guide 211 to the exterior of the guide 211. The brake fluid pressure of the master cylinder 3 is conducted to the piston 205 via the communication passage 212. A filter 213 is arranged to cover the communication passage 212 around the outer peripheral surface of the guide 211 to prevent foreign debris from entering the regulator valve 201. The above-described one way valve 208 is constituted by a valve seat 208a arranged in the seat valve unit 210 and a ball valve 208b provided adjacent to the valve seat 208a.

A filter 214 is arranged between the seat valve unit 210 and the piston 205 to cover the second port passage B. The filter 214 prevents foreign debris from entering the regulator valve 201 and also acts as a mechanical stopper for the ball valve 208b of the one way valve 208.

The above-described regulator valve 201 can be applied to the brake system in accordance with the present embodiment.

Operations of the brake system having the above-described construction will now be described.

While the brake pedal 1 is not depressed, the valve element of each described valve is at the position shown in FIG. 1, and the valve element 204 of the regulator valve 201 is being lifted from the valve seat 203.

When the brake pedal 1 is depressed by the vehicle driver, the same master cylinder pressure is developed in each of the primary and secondary chambers 6, 5 of the master cylinder 3. The master cylinder pressure is conducted to the wheel cylinders 7, 8 as well as to the wheel cylinders 9, 10. The master cylinder pressure is conducted to the wheel cylinders 9, 10 through the second brake circuit 21 via the first port passage A of the regulator valve 201. The conduction of the master cylinder pressure via the first port passage A is allowed since the piston 205 is urged toward the third port passage C by the spring 206.

When the anti-skid control is carried out, the respective wheel cylinders 7–10 are independently pressure-controlled by the corresponding pressurization control valves 31, 32, 41, 42 and the corresponding depressurization control valves 33, 34, 43, 44. Also, the motor 30 is driven to drive the pumps 36, 46 to recirculate the brake fluid reserved in the reservoirs 35, 45 back to the master cylinder 3. The linear differential pressure valve 101 and the suction valves 102, 207 are in the position shown in FIG. 1 while these valves are not energized. Furthermore, in the regulator valve 201, the piston 205 is still urged toward the third port passage C located on the right side of the FIG. 1 by the spring force since the hydraulic pressure in the connection point a is the same as the hydraulic pressure in the second port passage B.

When the brake assist control is carried out, the motor 30 is driven, and the suction valves 102, 207 are energized and are thereby opened. Furthermore, the linear differential pressure valve 101 is also energized. Thus, the pump 36 suctions the brake fluid from the secondary chamber 5 and discharges it between the linear differential pressure valve 101 and the pressurization control valves 31, 32. In the brake assist control, the panic brake pedal depression by the vehicle driver is detected when at least one of a master cylinder pressure gradient, a wheel acceleration, a vehicle body deceleration and a master cylinder pressure exceeds its predetermined value. The hydraulic pressure measured with the hydraulic pressure sensor 300 is regarded as the vehicle driver's will to depress the brake pedal 1, and the amount of the electric power supplied to the linear differential pressure valve 101 is controlled based on a hydraulic pressure measured with the hydraulic pressure sensor 300. For example, as the hydraulic pressure measured with the hydraulic pressure sensor 300 rises, the amount of the electric power is correspondingly increased, and vice versa. In this way, if the brake pedal is depressed deeply by the vehicle driver, a large differential pressure is generated by the linear differential pressurevalve 101. Consistent with the brake pedal depression, the pressure in the wheel cylinders 7, 8 is kept higher than the pressure in the master cylinder 3.

This pressure is also conducted from the connection point α to the first side 202a of the regulator chamber 202 through the regulator pipeline 25 and the third port passage C.

Similarly, in the second brake circuit 21, the pump 46 suctions the brake fluid from the primary chamber 6 and discharges it. At this stage, the brake fluid is recirculated to the primary chamber 6 of the master cylinder 3 through the second port passage B and the first port passage A of the regulator valve 201, and thereby the pressure in the wheel cylinders 9, 10 will never get a pressure higher than the master cylinder pressure.

However, the pressure conducted from the connection point α to the regulator chamber 202 through the third port passage C is higher than the wheel cylinder pressure of the second brake circuit 21, so that the piston 205 is moved toward the valve seat 203 of the first port passage A by overcoming the spring force of the spring 206 and the wheel cylinder pressure of the second brake circuit 21. When the valve element 204 is seated against the valve seat 203, the flow of the brake fluid from the wheel cylinders 9, 10 to the primary chamber 6 is prevented, so that the pressure in the wheel cylinders 9, 10 is increased. At this stage, the pressure in the wheel cylinders 7, 8 is equal to a sum of the pressure in the wheel cylinders 9, 10 and the spring force of the spring 206. However, the spring force of the spring 206 can be very small since the spring force of the spring 206 is only that required to overcome the frictional resistance between the seal member of the piston 205 and the opposing inner wall surface of the housing 150 to urge the piston 205 toward the right side of FIG. 2. As a result, the valve element 204 will be kept seated against the valve seat 203 until the brake fluid pressure in the wheel cylinders 7, 8 becomes substantially equal to the brake fluid pressure in the wheel cylinders 9, 10.

The operation of the brake system in accordance with the present embodiment will be further discussed in connection with a situation where a differential pressure between the pressure in the wheel cylinders 9, 10 and the pressure in the wheel cylinders 7, 8 is developed due to, for example, a difference in discharge capacity between the pump 46 and the pump 36.

First, it is assumed that the discharge capacity of the pump 46 becomes higher than that of the pump 36, and thereby the pressure in the wheel cylinders 9, 10 in the second brake circuit 21 becomes higher than the pressure in the wheel cylinders 7, 8 in the first brake circuit 11. In such a case, the higher pressure is supplied to the regulator chamber 202 through the second port passage B, and thereby the pressure in the second port passage B becomes higher than the pressure supplied from the regulator pipeline 25. Thus, the piston 205 is urged toward the right side of FIG. 2 to lift the valve element 204 from the valve seat 203. Then, when the pressure in the wheel cylinders 9, 10 is supplied to the primary chamber 6 and becomes equal to the pressure in the wheel cylinders 7, 8, the valve element 204 is seated against the valve seat 203 to dicommunicate the primary chamber 6 from the wheel cylinders 9, 10.

Then, it is assumed that the discharge capacity of the pump 36 becomes higher than that of the pump 46, and thereby the pressure in the wheel cylinders 7, 8 in the first brake circuit 11 becomes higher than the pressure in the wheel cylinders 9, 10 in the second brake circuit 21. In such a case, the higher pressure is supplied from the connection point a to the regulator chamber 202 through the third port passage C. Thus, the piston 205 is moved toward the left side of FIG. 2, so that the valve element 204 is seated against the valve seat 203 to dicommunicate the primary chamber 6 from the wheel cylinders 9, 10. As a result, the pressure in the second side 202b of the regulator chamber 202 is increased by the pump 46 until it becomes substantially equal to the pressure in the first side 202a of the regulator chamber 202. As described above, the difference in the discharge capacity between these pumps 36, 46 is due to, for example, the difference in the amount of the supplied electric power (for example, due to a difference in resistance of the conductive lines) between these pumps 36, 46 and/or a difference in the sealing performance between these pumps 36, 46. Thus, there is a difference in the ability to raise the pressure between these pumps 36, 46, but there is no significant difference in the maximum discharge pressure (or the maximum pressure (bar) in each pipeline developed by each pump 36, 46) between these pumps 36, 46. Furthermore, each pump 36, 46 generally has a maximum discharge pressure of 250 bar. With this maximum discharge pressure, it is possible to substantially eliminate a difference between the first brake circuit 11 and the second brake circuit 21.

As discussed above, even if a differential pressure is generated between the wheel cylinders 7, 8 of the first brake circuit 11 and the wheel cylinders 9, 10 of the second brake circuit 21, it is possible to substantially eliminate the differential pressure by use of the regulator valve 201 and the regulator pipeline 25.

In the described embodiment, the regulator valve 201 is provided for the primary chamber 6, and the linear differential pressure valve 101 is provided for the secondary chamber 5. Alternatively, the regulator valve 201 can be provided for the secondary chamber 5, and the linear differential pressure valve 101 can be provided for the primary chamber 6.

The use of the mechanical regulator valve 201 as in the first embodiment provides higher reliability than an electrical regulator valve that electrically compensates the differential pressure between the first and second brake circuits. Furthermore, the seal provided by the piston 205 substantially separates between the first brake circuit 11 and the second brake circuit 21. Thus, even if the brake fluid leaks out from the pipeline in the first brake circuit 11 due to a mechanical damage to the pipeline, and thereby the wheel cylinder pressure cannot be provided through the first brake circuit 11, the wheel cylinder pressure can be provided from the master cylinder through the second brake circuit 21 to ensure the sufficient wheel braking force. Furthermore, in the event of a failure (damage) of the first or second brake circuit 11, 21, it is important to provide means for applying a large enough hydraulic pressure to the remaining one of the first and second brake circuits 11, 21 by a volume of the brake fluid in the primary chamber 6 or the secondary chamber 5 of the master cylinder 3 even if the piston 205 is urged to the left or right end position in FIG. 2. In other words, each of a maximum volume of the hydraulic fluid in the first side 202a of the regulator chamber 202 and a maximum volume of the hydraulic fluid in the second side 202b of the regulator chamber 202 should be sufficiently smaller than either a volume of the hydraulic fluid in the primary chamber 6 or a volume of the hydraulic fluid in the secondary chamber 5, whichever is smaller. However, the volume of the primary chamber 6 and the volume of the secondary chamber 5 are normally the same.

(Second Embodiment)

Figure 3:
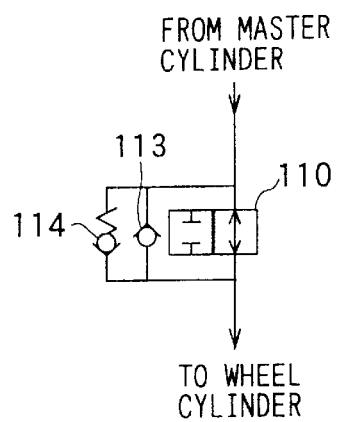
FIG. 3 is a schematic partial view showing a linear differential pressure valve of a brake system according to a second embodiment of the present invention.

In this embodiment, the linear differential pressure valve 101 of the first embodiment is replaced with other type of arrangement. Since other components in this embodiment are the same as those shown in FIG. 1, these components are not further discussed herein. FIG. 3 shows the arrangement that is used in place of the linear differential pressure valve 101 of FIG. 1. As shown in FIG. 3, the linear differential pressure valve 101 and the check valve 103 arranged in the first brake circuit 11 in the first embodiment are replaced with a two position valve 110, which is shiftable between a communicating position and a blocking position, a check valve 113 and a differential pressure check valve 114.

In this arrangement, while the two position valve 110 is energized, a differential pressure that is mechanically set by the differential pressure check valve 114 is developed between the master cylinder pressure and the pressure in the wheel cylinders 7, 8 to make the pressure in the wheel cylinders 7, 8 higher than the master cylinder pressure by the amount of the differential pressure.

(Third Embodiment)

Figure 4:
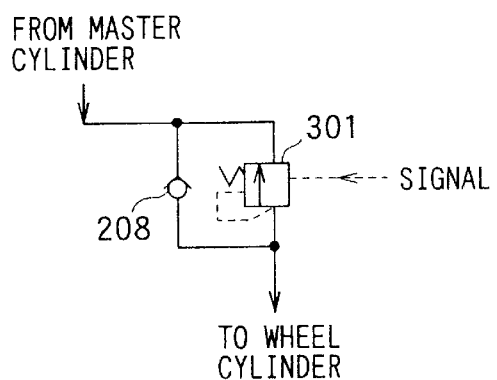
FIG. 4 is a schematic partial view showing a regulator valve of a brake system according to a third embodiment of the present invention.

In this embodiment, the regulator valve 201 of the first embodiment is replaced with other type of arrangement. Since other components in this embodiment are the same as those shown in FIG. 1, these components are not further discussed herein. FIG. 4 shows the arrangement that is used in place of the regulator valve 201 shown in FIG. 1. As shown in FIG. 4, the mechanical regulator valve 201 in the first embodiment is replaced with a valve 301 capable of electrically maintaining the pressure in the wheel cylinders 9, 10 to be higher than the pressure in the primary chamber 6. That is, the hydraulic pressure in the connection point a is measured, for example, with a pressure sensor, and a signal indicative of the measured hydraulic pressure is inputted from the pressure sensor to the valve 301. Based on the signal inputted to the valve 301, the differential pressure between the pressure in the wheel cylinders 9, 10 and the pressure in the primary chamber 6 in the second brake circuit 21 is generated. With this arrangement, it is possible to compensate the differential pressure between the first and second brake circuits 11, 21 induced, for example, by the difference in the capacity between the pump 36 and the pump 46.

(Fourth Embodiment)

Figure 5:
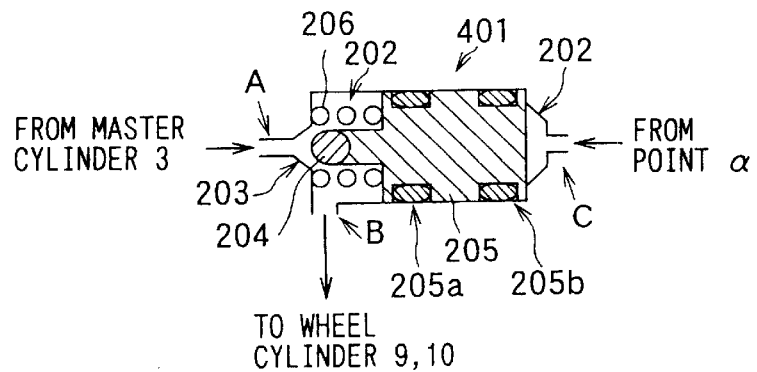
FIG. 5 is a schematic partial view showing a regulator valve of a brake system according to a fourth embodiment of the present invention.

FIG. 5 shows a longitudinal cross-sectional view of a regulator valve 401 according to the present embodiment used in place of the regulator valve 201 of the first embodiment. Since other components in this embodiment are the same as those shown in FIG. 1, these components are not further discussed herein. Although, only one seal means (seal 205a) is provided in the regulator valve 201 in the first embodiment, two seal means (first and second seals 205a, 205b) that are arranged in series are provided in the regulator valve 401 in this embodiment. That is, the seal that fluid-tightly separates between the third port passage C and the first and second port passages A, B is constituted by the first and second seals 205a, 205b. With this construction, even if one of the two seals 205a, 205b has failed when the pipeline in one of the two brake circuits is damaged, the remaining normal brake circuit can be used for braking action, implementing further enhanced fail-safe backup to improve the reliability of the brake system.

(Fifth Embodiment)

Figure 6:
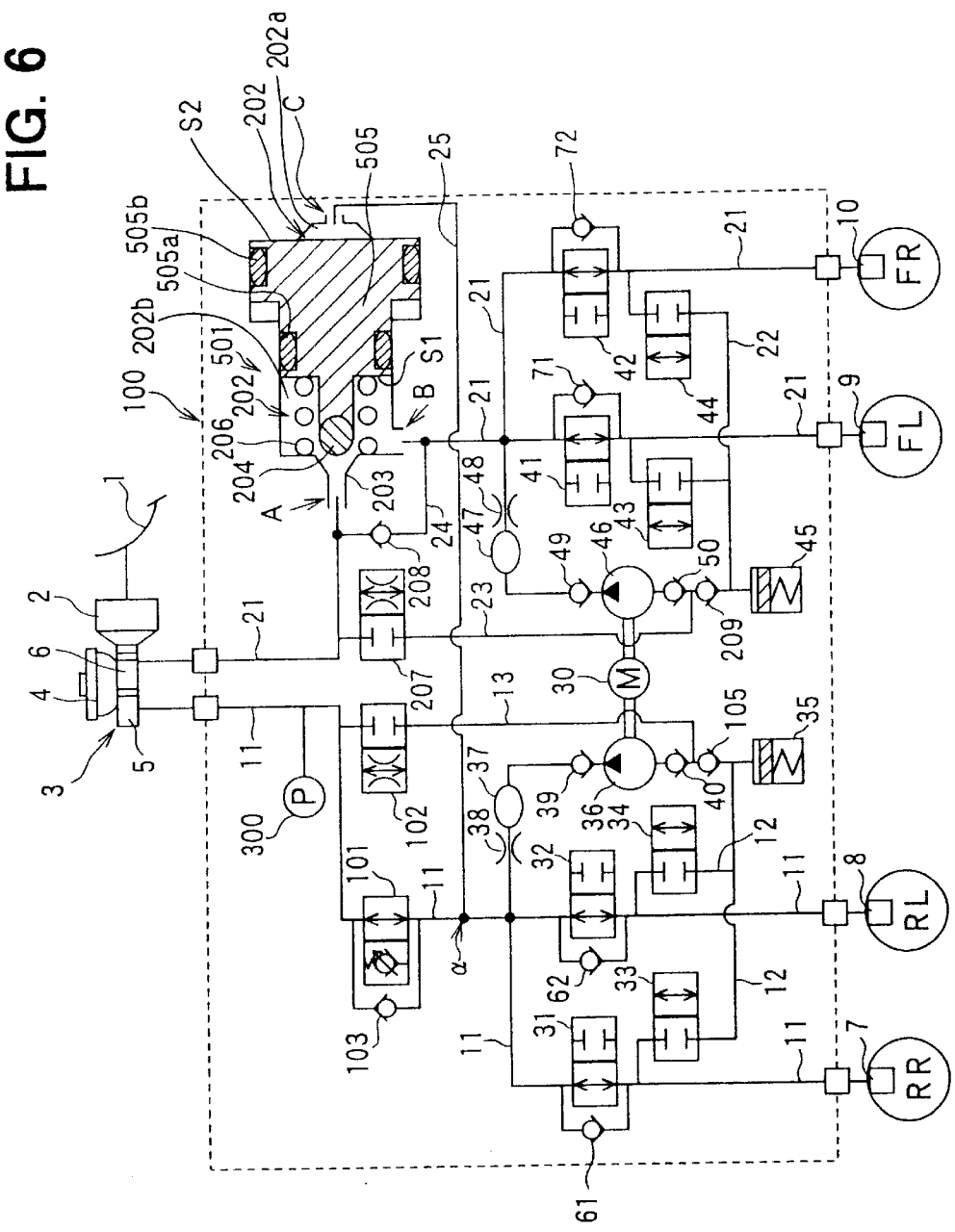
FIG. 6 is a schematic view of a brake system having a regulator valve according to a fifth embodiment of the present invention.

FIG. 6 shows an entire structure of a brake system according to a fifth embodiment of the present invention. In the present embodiment, a regulator valve 501 is arranged in a vertically split brake system. Since the basic construction of the present embodiment is the same as that of FIG. 1, similar parts are designated by similar numerals and are not further discussed herein.

The first brake circuit 11 is connected to the right rear wheel RR and the left rear wheel RL. The second brake circuit 21 is connected to the right front wheel FR and the left front wheel FL.

Similar to the regulator valve 201 shown in FIG. 1, the regulator valve 501 has the first to third port passages A, B, C arranged in the regulator chamber 202 as well as the valve seat 203 and the valve element 204 that are fitted in a manner similar to that discussed with reference to FIG. 1. However, a piston 505 of the regulator valve 501 differs from the piston 205 shown in FIG. 1 and is made as a stepped piston. One piston surface S2 of the stepped piston 505, which is disposed adjacent to the third port passage C communicated with the connection point a, is larger than other piston surface S1, which is disposed in the regulator chamber 202 adjacent to the first and second port passages A, B. With this arrangement, the pressure in the third port passage C and the pressure in the first port passage A are balanced only when a wheel cylinder pressure ratio between the first and second brake circuits reaches S2/S1 (in this instance, the spring force of the spring 206 is assumed to be very small in comparison to the hydraulic pressure force, so that the spring force of the spring 206 is ignored).

When the brake assist control is carried out in the vertically split brake system, and thereby the pressure in the wheel cylinders 7–10 becomes higher than the master cylinder pressure, the regulator valve 501 can be used to appropriately allocate the front wheel braking force and the rear wheel braking force. A seal 505a, 505b is arranged at each step of the piston 505.

(Sixth Embodiment)

Figure 7:
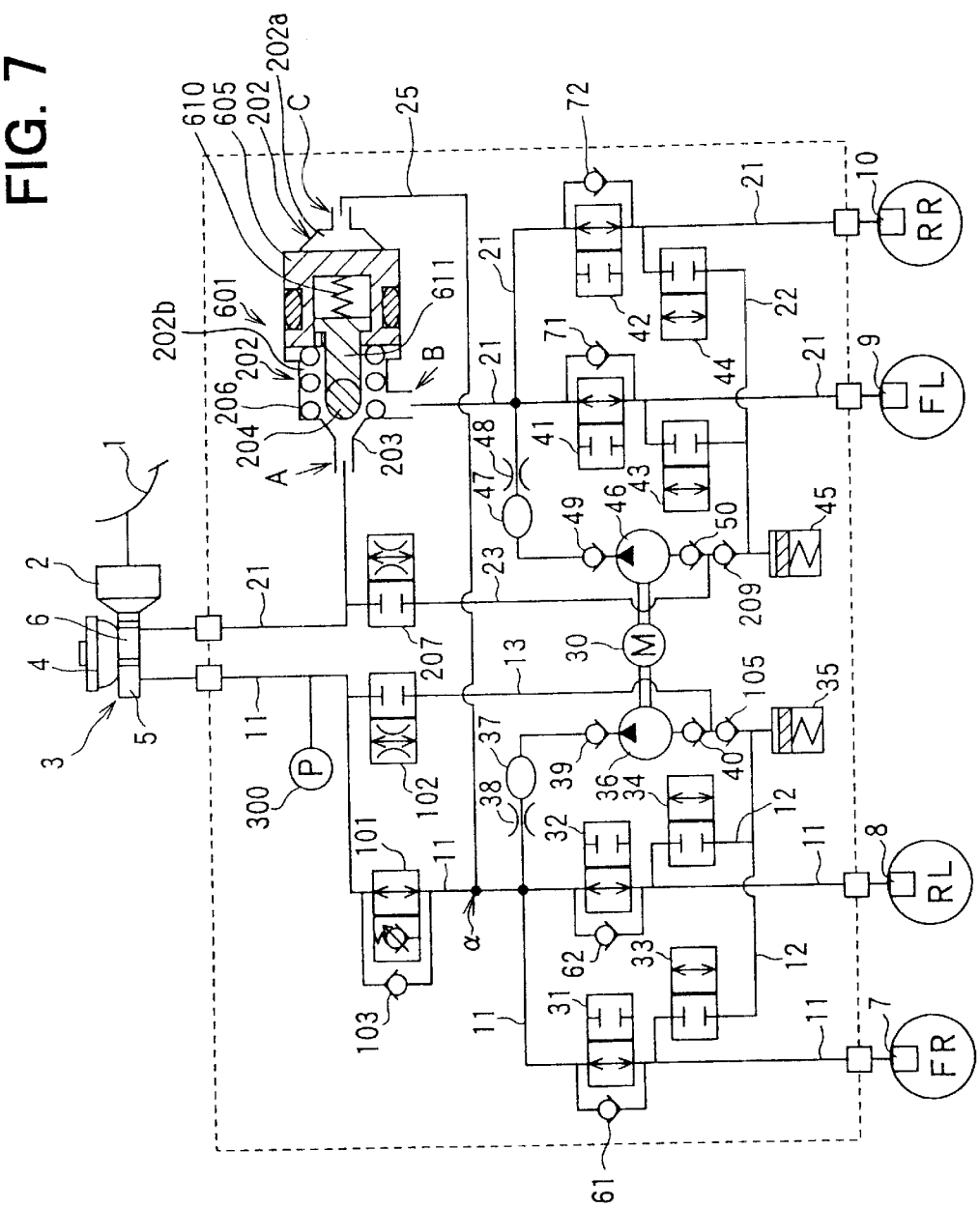
FIG. 7 is a schematic view of a brake system having a regulator valve according to a sixth embodiment of the present invention.

FIG. 7 shows an entire structure of a brake system according to a sixth embodiment of the present invention. In the present embodiment, there is provided a regulator valve 601 containing a check valve mechanism therein. Since the basic construction of the present embodiment is the same as that of FIG. 1, similar parts are designated by similar numerals and are not further discussed herein.

Within the piston 605, there is provided a check valve spring 610 for urging a rod 611 provided with the valve element 204 toward the left side of FIG. 7. The hydraulic pressure supplied from the second port passage B is conducted to a chamber within the piston 605 where the check valve spring 610 is disposed. With this construction, during a normal state, i.e., a non-braking state, a normal braking state, an anti-skid braking state or a brake-assist state, the piston 605 and the rod 611 are moved together.

During the brake assist control, when a pressure that is equal to or greater than the hydraulic pressure in the connection point α is developed in the master cylinder 3, that is, the vehicle driver depresses the brake pedal 1 further, the rod 611 compresses the check valve spring 610 and moves toward the right side of FIG. 7 to lift the valve element 204 from the valve seat 203, allowing conduction of the master cylinder pressure to the wheel cylinders 9, 10.

(Seventh Embodiment)

Figure 8:
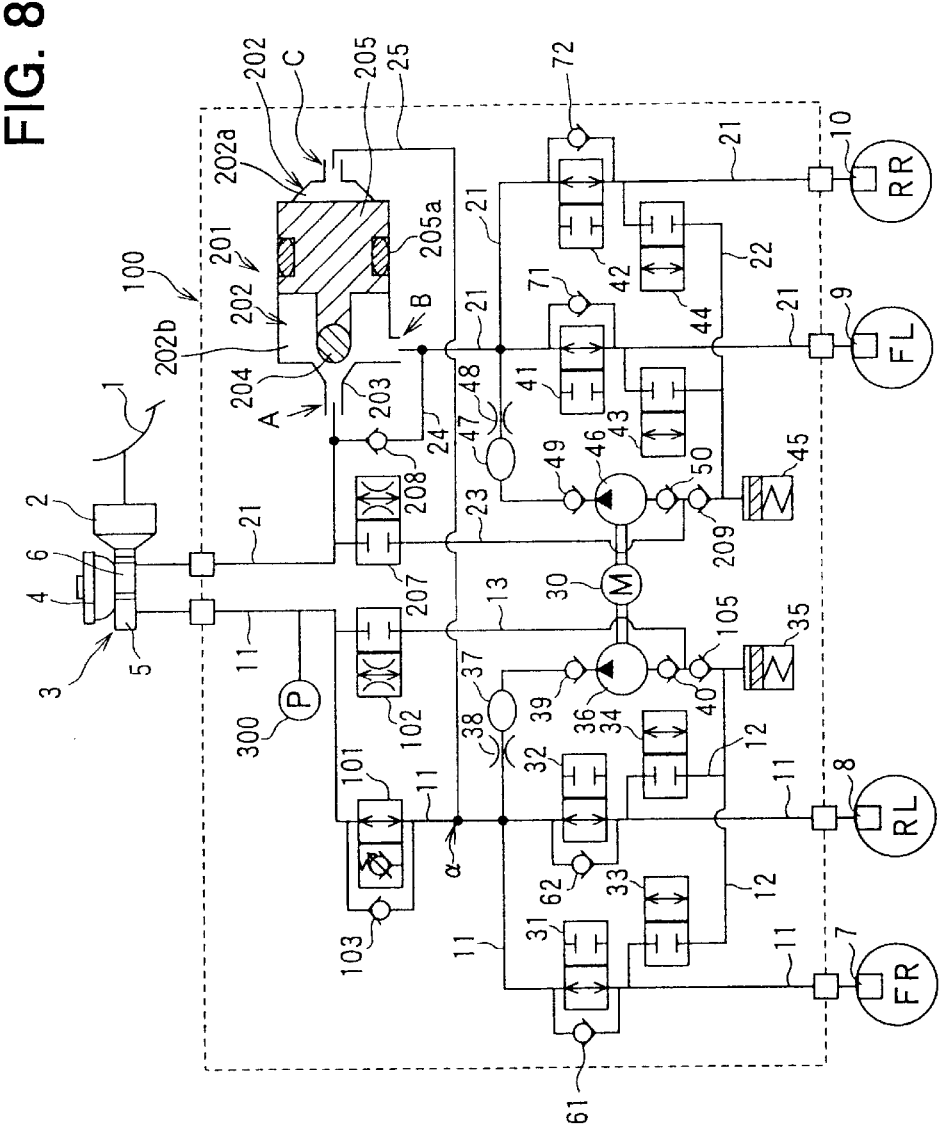
FIG. 8 is a schematic view of a brake system having a regulator valve according to a seventh embodiment of the present invention.

FIG. 8 shows an entire structure of a brake system according to a seventh embodiment of the present invention. The brake system according to the present embodiment is substantially the same as that of the first embodiment except that the spring 206 of the regulator valve 201 is eliminated.

In the present embodiment, the force comparable with the spring force of the spring 206 of the first embedment is implemented by a restoring force of the seal 205a made of elastic material, such as rubber, generated after deformation of the seal 205a.

That is, the seal 205a can slide along the inner side-wall surface of the regulator chamber 202 as the piston 205 moves. However, before the seal 205a initiates this sliding motion, the seal 205a is deformed and thereby provides the restoring force. As a result, when the piston 205 moves toward the left side of FIG. 8, the restoring force is generated by the seal 205a, so that the piston 205 can be pulled back toward the right side of FIG. 8 by the restoring force of the seal 205a. The amount of the valve lift of the valve element 204 is very small, so that the regulator valve 201 can be effectively opened or closed by the deformation of the seal 205a without actually sliding the seal 205a along the inner side-wall surface of the regulator chamber 202. The seal 205a and a channel formed along the outer peripheral of the piston 205 for accommodating the seal 205a are closely engaged with each other without forming a gap between them in a sliding direction of the piston 205. This arrangement advantageously allows the piston 205 to return to its initial position. This is due to the fact that if the gap is provided between the seal 205a and the channel in a sliding direction of the piston 205, the seal 205a moves through the gap when the piston 205 slides, so that the piston is no longer able to return to its initial position by the restoring force of the seal 205a alone.

Since the spring 206 shown in FIG. 1 is eliminated in this embodiment, the piston can be moved with a much smaller differential pressure than the differential pressure required in the case of the spring 206. As a result, advantageously, the pressure in the first brake circuit 11 and the pressure in the second brake circuit 21 can be substantially equalized, and the number of components can be reduced.

(Eighth Embodiment)

Figure 9:
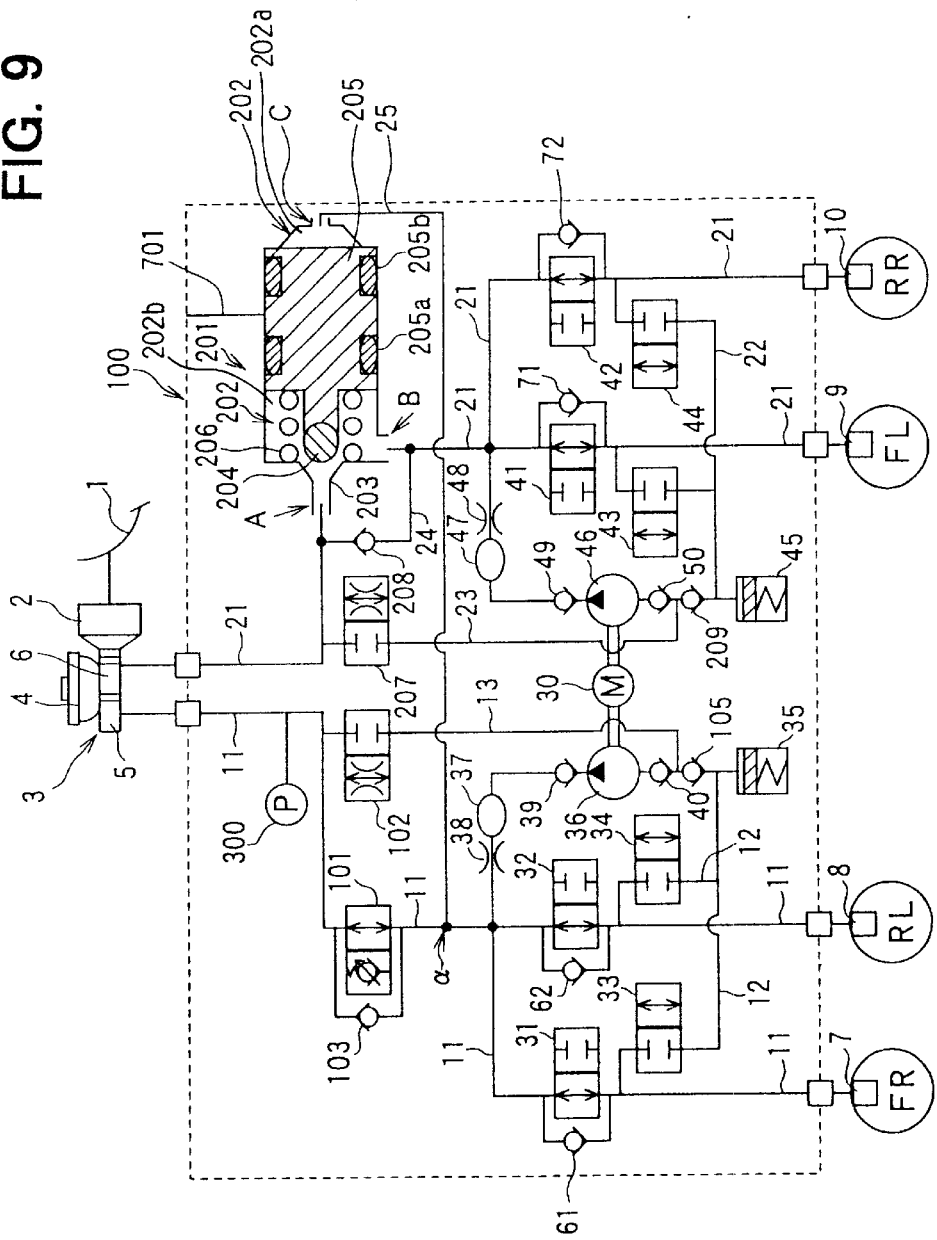
FIG. 9 is a schematic view of a brake system having a regulator valve according to an eighth embodiment of the present invention.

FIG. 9 shows an entire structure of a brake system according to an eighth embodiment of the present invention. The brake system according to the present embodiment is substantially the same as that of the fourth embodiment except that a space between the first seal 205a and the second seal 205b is communicated to atmosphere through a communication passage 701.

As described in connection with the fourth embodiment, the two seals 205a, 205b are provided to ensure the sealing between the second side 202b of the regulator chamber 202 and the first side 202a of the regulator chamber 202. However, there is a chance that both the seals 205a, 205b fail due to, for example, a damage. In such a case, it is advantageous to allow detection of the failure of one seal before other seal is failed, so that an effective countermeasure can be taken before the other seal is failed.

The communication passage 701 extends outwardly from a space between the first seal 205a and the second seal 205b to allow egress of the brake fluid through the communication passage 701 upon the failure of the one seal, allowing the detection of the failure of the one seal.

In this case, although the egress of the brake fluid can be directly detected by observing the brake fluid dropped on the ground, the egress of the brake fluid can be also indirectly detected based on a fluid level signal outputted from a fluid level switch arranged in the master cylinder reservoir 4 when a brake fluid level within the master cylinder reservoir 4 drops below a predetermined level and thereby activates the fluid level switch. Furthermore, the egress of the brake fluid can be also indirectly detected based on an increase in the amount of the stroke of the brake pedal 1 induced by the decrease in the amount of the brake fluid.

Preferably, the brake fluid is egressed to a place where the egress of the brake fluid has a minimum effect. The brake fluid can be egressed, for example, into a spring chamber located at a rear surface of an ABS reservoir, or into an intermediate air chamber located between the pump and the motor.

(Ninth Embodiment)

Figure 10:
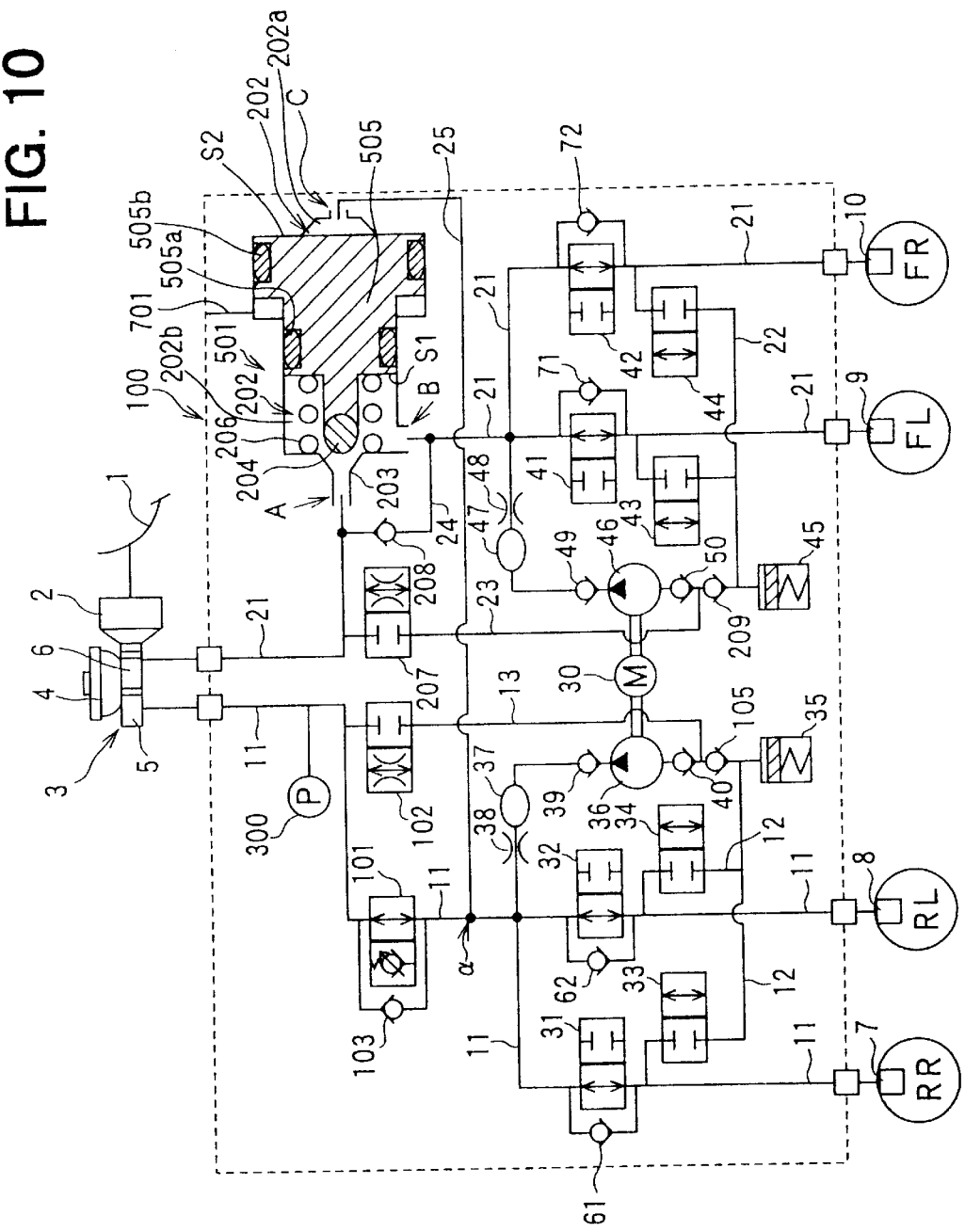
FIG. 10 is a schematic view of a brake system having a regulator valve according to a ninth embodiment of the present invention.

FIG. 10 shows an entire structure of a brake system according to a ninth embodiment of the present invention. The brake system according to the present embodiment is substantially the same as that of the fifth embodiment except that a space between the first seal 505a and the second seal 505b is communicated to atmosphere through a communication passage 701.

Even in such a case where the size difference is made between the opposing piston surfaces S1, S2 of the piston 505, the provision of the communication passage 701 to atmosphere can provide advantages similar to those of the eighth embodiment.

(Other Embodiments)

1. Although the present invention is discussed in connection with the diagonally split brake system in the first embodiment and several other embodiments, the diagonally split brake system can be changed to a vertically split brake system. That is, the first brake circuit 11 can be arranged for the right front wheel FR and the left front wheel FL, and the second brake circuit 21 can be arranged for the right rear wheel RR and the left rear wheel RL. Furthermore, although the spring-load of the spring 206 is very small in the first embodiment and several other embodiments, the spring-load can be set to provide a differential pressure, which is equal to the spring-load, between the wheel cylinder pressure of the first brake circuit 11 and the wheel cylinder pressure of the second brake circuit 21. That is, the spring 206 also provides a function of a general proportional valve. If the spring load of the spring 206 is adjusted in the above-described manner, a predetermined difference in the braking force between the front wheels and the rear wheels can be provided during the brake assist operation to stabilize the vehicle body motion. During the brake assist operation, the forward directional weight shift of the vehicle body is greater than the normal braking operation, so that this arrangement will provide a substantial advantage.

2. In the fifth embodiment, although the invention is discussed in connection with the vertically split brake system, the discussion in the fifth embodiment can be equally applicable to the diagonally split brake system. In such a case, although the spring load of the spring 206 is very small so the effect of the spring load is ignorable, the spring load of the spring 206 can be modified as follows to more precisely control the balance of the braking forces between the left wheel brake circuit and the right wheel brake circuit.

That is, the wheel cylinder pressure of the first brake circuit 11 (i.e., the pressure in the connection point α) is set to be equal to a sum of the spring force of the spring 206 and the wheel cylinder pressure of the second brake circuit 21 (i.e., the pressure conducted through the second port passage B). In this way, the wheel cylinder pressure of the first brake circuit 11 becomes greater than the wheel cylinder pressure of the second brake circuit 21 by the amount corresponding to the spring force of the spring 206. However, if the sizes of the piston surfaces S1, S2 of the stepped piston 505 of FIG. 5 are appropriately selected to eliminate the spring force of the spring 206, the wheel cylinder pressure of the first brake circuit 11 and the wheel cylinder pressure of the second brake circuit 21 can be equalized.

Figure 11:
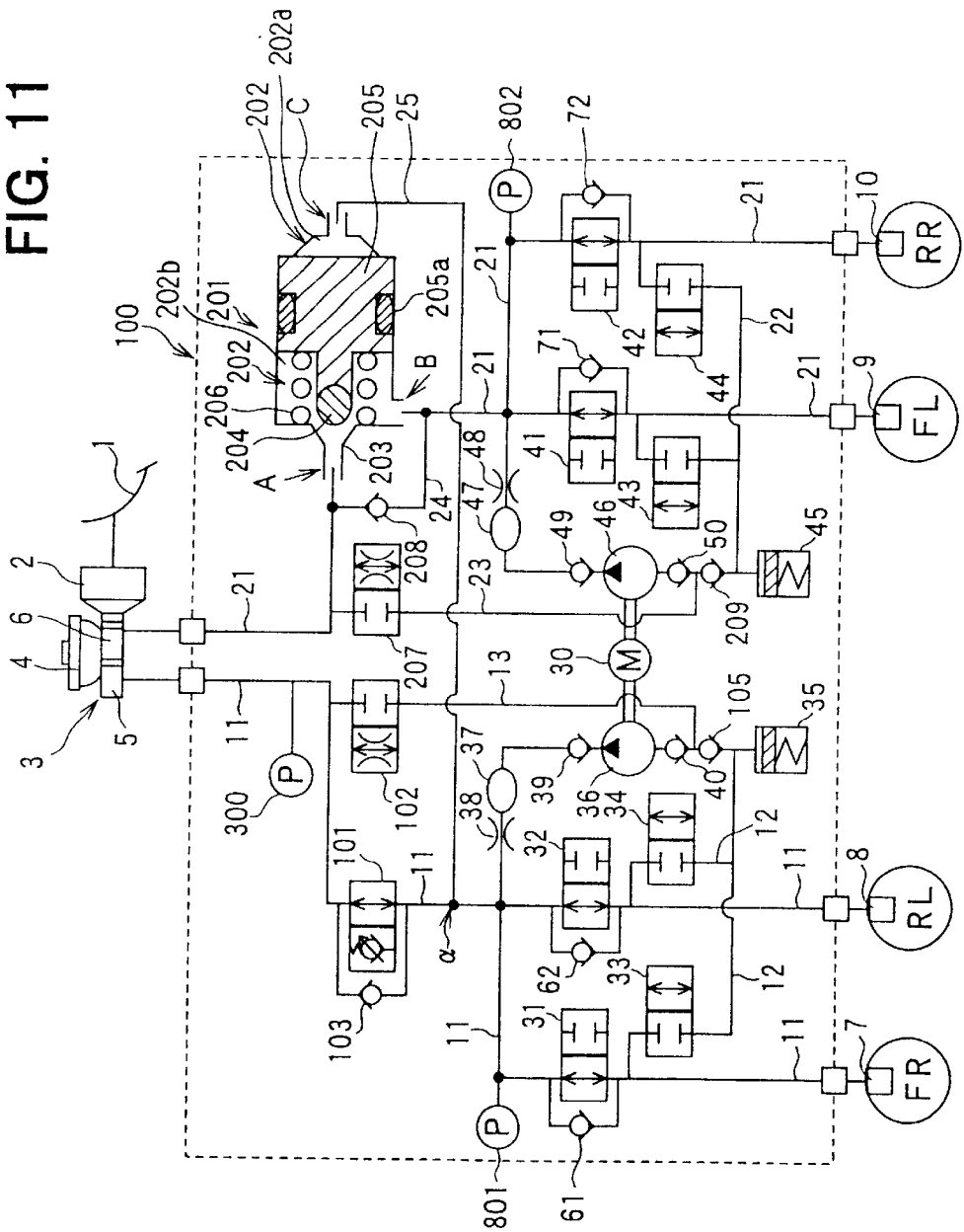
FIG. 11 is a schematic view of a brake system according to other embodiment of the present invention.

3. Each of the above-described embodiments can be modified as follows. As shown in FIG. 11, a hydraulic pressure sensor 801 is inserted in the first brake circuit 11 between the pressurization control valves 31, 32 and the linear differential pressure valve 101. Furthermore, another hydraulic pressure sensor 802 is inserted in the second brake circuit 21 between the pressurization control valves 41, 42 and the second port passage B of the regulator valve 201. If a differential pressure is detected based on the hydraulic pressure values measured with the hydraulic pressure sensors 801, 802, a warning (or notification) can be given to the vehicle driver. That is, if the regulator valve 201 (or 301, 401, 501, 601) is failed, for example, due to presence of debris between the valve seat 203 and the valve element 204, a differential pressure may be generated between the wheel cylinder pressure of the first brake circuit 11 and the wheel cylinder pressure of the second brake circuit 21. If this has occurred, the warning may be given to the vehicle driver. Instead of giving the warning, the brake assist control may be interrupted or prohibited.

Figure 12:
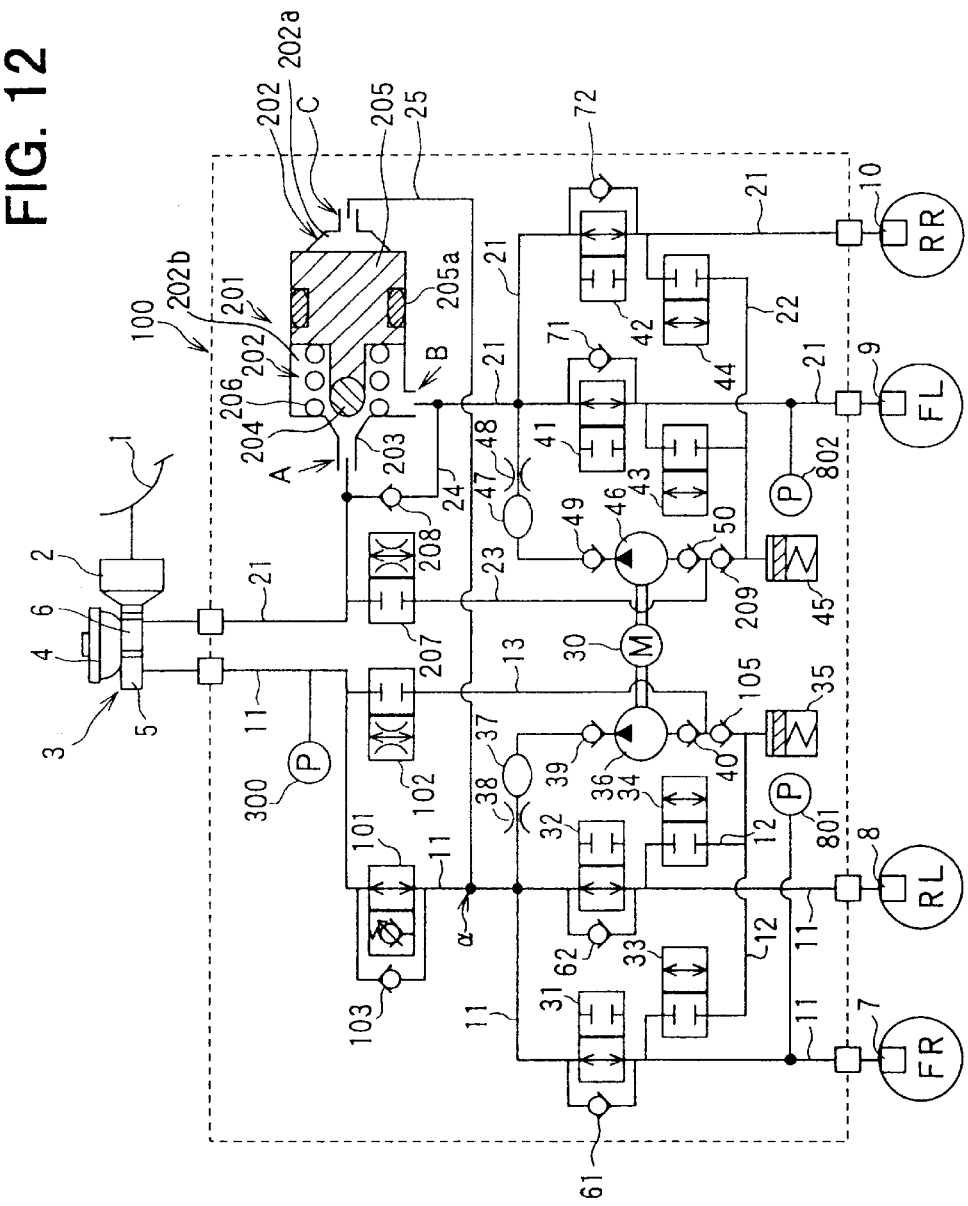
FIG. 12 is a schematic view of a brake system according to still other embodiment of the present invention.

4. The position of the hydraulic pressure sensor is not limited to between the pressurization control valves 31, 32 and the linear differential pressure valve 101 but can be between any one of the wheel cylinders 7–10 and the corresponding one of the pressurization control valves 31, 32, 41, 42, as shown in FIG. 12. For example, the hydraulic pressure sensor 801 can be arranged between the pressurization control valve 31 and the wheel cylinder 7 in the first brake circuit 11, and the hydraulic pressure sensor 802 can be arranged between the pressurization control valve 41 and the wheel cylinder 9 in the second brake circuit 21. If a differential pressure between the wheel cylinder pressure of the first brake circuit 11 and the wheel cylinder pressure of the second brake circuit 21 is measured with the hydraulic pressure sensors 801, 802, a warning (or notification) may be given to the vehicle driver, or alternatively the brake assist control may be interrupted or prohibited.

Figure 13:
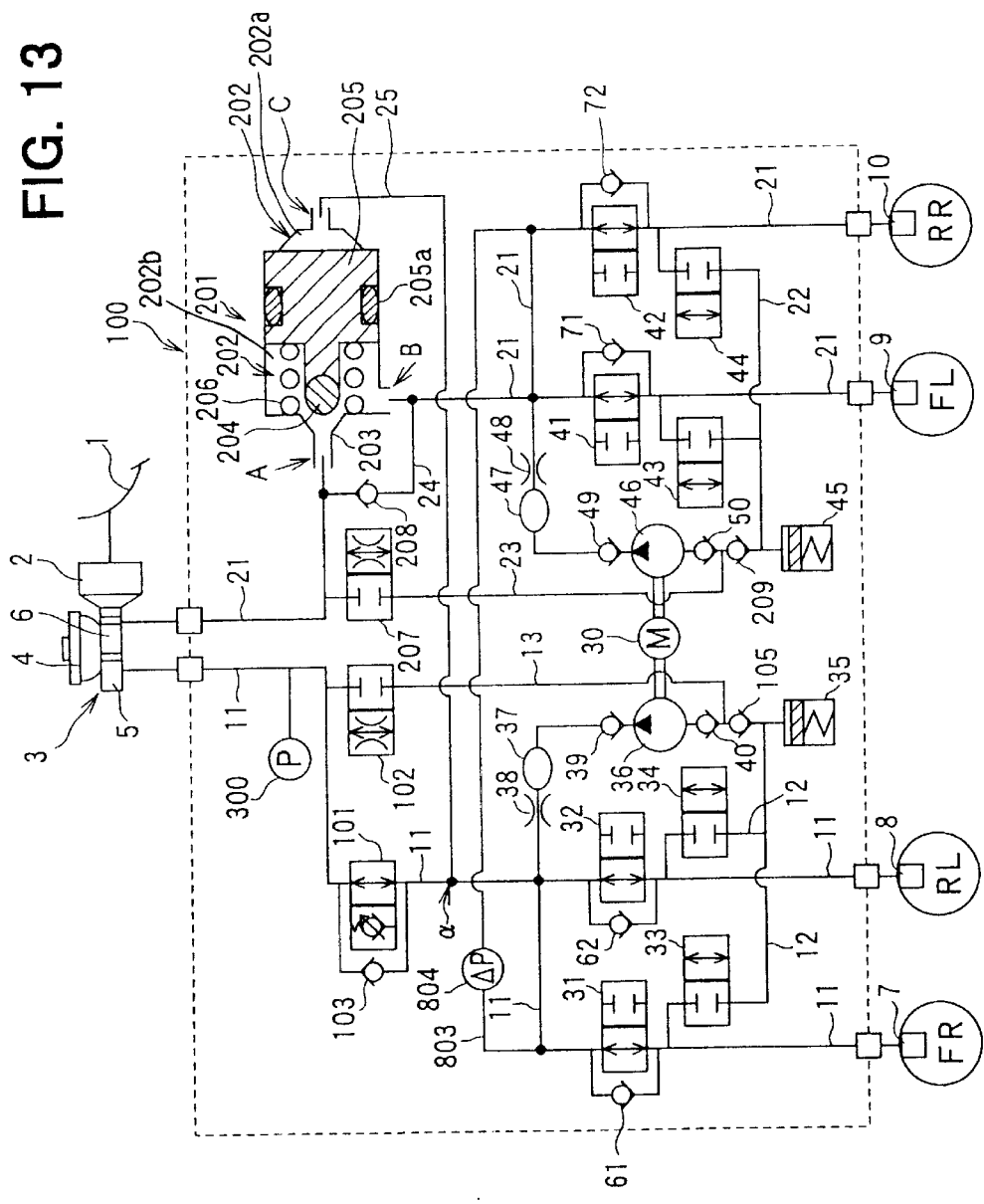
FIG. 13 is a schematic view of a brake system according to still other embodiment of the present invention.

5. In each of the above-described embodiment, as shown in FIG. 13, a differential pressure measurement pipeline 803 may be extended out from anywhere between the pressurization control valves 31, 32 and the linear differential pressure valve 101 in the first brake circuit 11 to anywhere between the pressurization control valves 41, 42 and the second port passage B of the regulator valve 201 in the second brake circuit 21. A differential pressure switch 804 may be inserted in the differential pressure measurement pipeline 803. If a differential pressure between the wheel cylinder pressure of the first brake circuit 11 and the wheel cylinder pressure of the second brake circuit 21 is measured with the differential pressure switch, a warning (or notification) may be given to the vehicle driver, or alternatively the brake assist control may be interrupted or prohibited.

Figure 14:
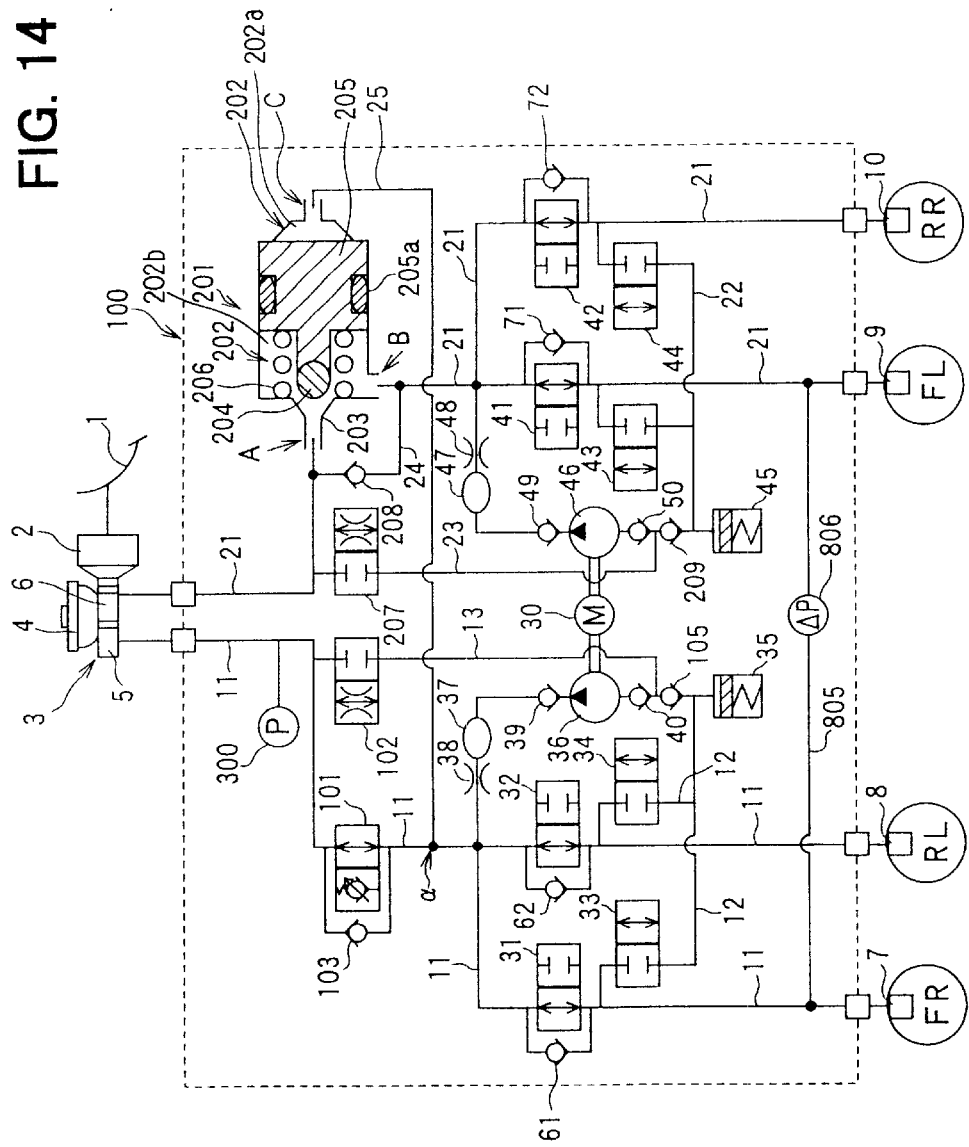
FIG. 14 is a schematic view of a brake system according to still other embodiment of the present invention.

6. In the described case, as shown in FIG. 14, alternatively, a differential pressure measurement pipeline 805 may be extended out from anywhere between the pressurization control valves 31, 32 and the wheel cylinders 7, 8 in the first brake circuit 11 to anywhere between the pressurization control valves 41, 42 and the wheel cylinders 9, 10 in the second brake circuit 21. A differential pressure switch 806 may be inserted in the differential pressure measurement pipeline 805.

Figure 15:
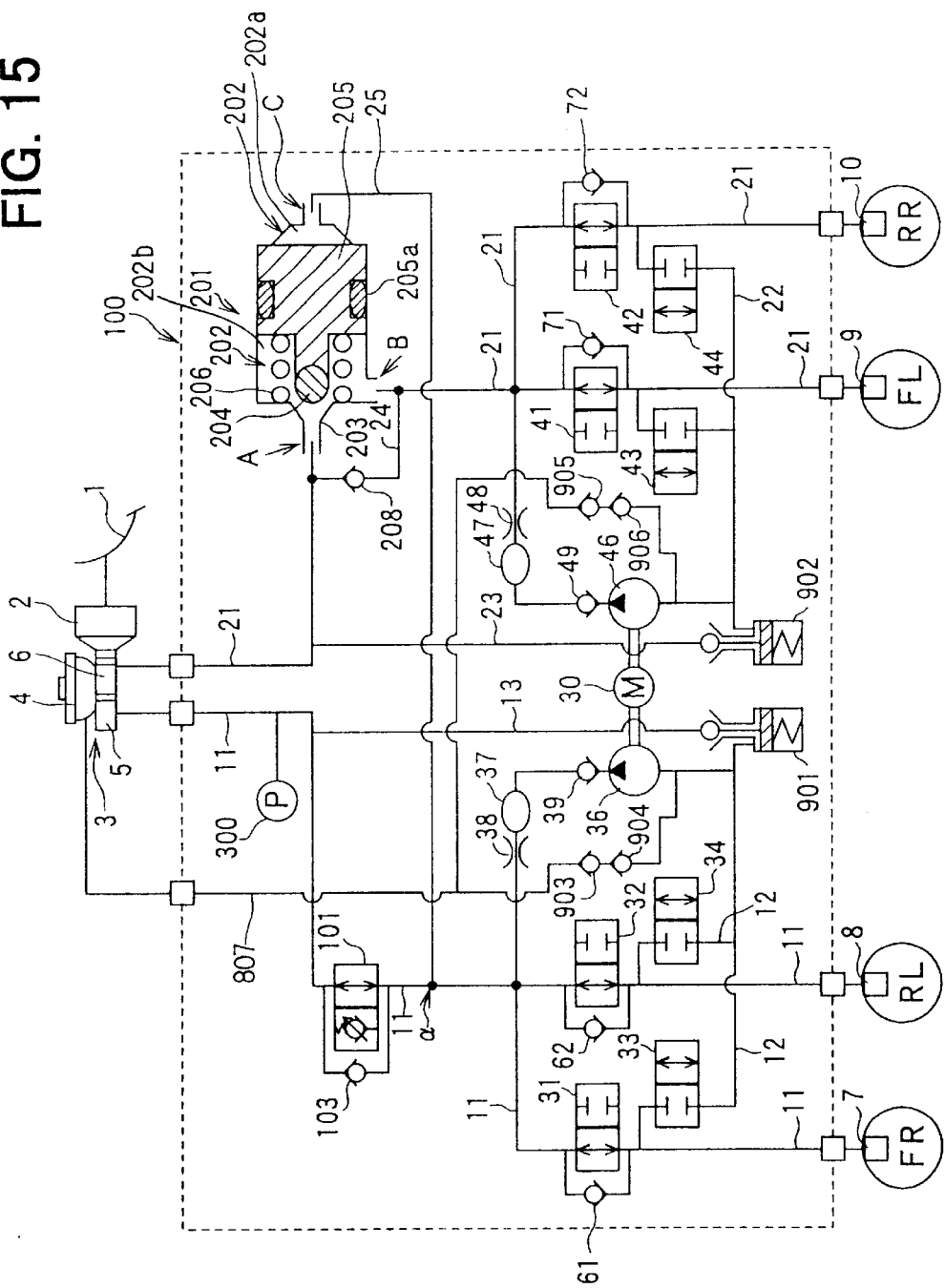
FIG. 15 is a schematic view of a brake system according to still other embodiment of the present invention.

7. In each of the above-described embodiment, as shown in FIG. 15, well known switching reservoirs 901, 902 may be used in the place of the reservoirs 35, 45 and the suction valves 102, 207. Each switching reservoir 901, 902 allows the brake fluid in the master cylinder 3 to flow toward the suction port of the corresponding pump 36, 46, thereby reducing the master cylinder pressure. When the amount of the brake fluid in the switching 5 reservoir 901, 902 is above a predetermined level, the brake fluid in the switching reservoir 901, 902 is suctioned by the pump 36, 46. When the amount of the brake fluid in the switching reservoir 901, 902 is below or equal to the predetermined level, the brake fluid in the master cylinder 3 is suctioned by the pump 36, 46.

By use of the switching reservoir 901, 902, the brake fluid pressure supplied to the suction port of the pump 36, 46 can be maintained at a predetermined pressure value. As a result, when a gear pump, such as a trochoid pump, is used as the pump 36, 46, hydraulic pressure pulsation can be eliminated by the switching reservoir 901, 902, so that the pressure regulating action of the regulator valve 201 can be advantageously stabilized.

In this instance, as shown in FIG. 15, a pipe line 807 is extended out from the master cylinder reservoir 4 to a point between the suction port of the pump 36 and the switching reservoir 901 in the first brake circuit 11 and also to a point between the suction port of the pump 46 and the switching reservoir 902 in the second brake circuit 21 to allow suctioning of the brake fluid from the master cylinder reservoir 4 by the pumps 36, 46. To prevent back flow of the brake fluid from these points to the master cylinder 4, check valves 903–906 are in the pipe line 807.

Additional advantages and modifications will readily occur to those skilled in the art. The invention in its broader terms is therefore, not limited to the specific details, representative apparatus, and illustrative examples shown and described.

What is claimed is:

1. A brake system for a vehicle comprising:
  a master cylinder having first and second chambers in each of which a master cylinder pressure is generated in response to brake operation by a vehicle driver;
  first and second wheel cylinders for exerting a first braking force on first and second vehicle wheels, respectively, by a first wheel cylinder pressure generated based on said master cylinder pressure in said first chamber of said master cylinder;
  a first brake circuit for connecting said master cylinder to said first and second wheel cylinders;
  third and fourth wheel cylinders for exerting a second braking force on third and fourth vehicle wheels, respectively, by a second wheel cylinder pressure generated based on said master cylinder pressure in said second chamber of said master cylinder;
  a second brake circuit for connecting said master cylinder to said third and fourth wheel cylinders;
  first brake assist means arranged in said first brake circuit to increase said first wheel cylinder pressure to a level higher than said master cylinder pressure in said first chamber and to conduct said increased first wheel cylinder pressure to at least one of said first and second wheel cylinders in response to at least one of a state of said brake operation by said vehicle driver and a braking state of said vehicle; and second brake assist means arranged in said second brake circuit to increase said second wheel cylinder pressure to a level higher than said master cylinder pressure in said second chamber and to conduct said increased second wheel cylinder pressure to at least one of said third and fourth wheel cylinders in response to at least one of said state of said brake operation by said vehicle driver and said braking state of said vehicle, wherein said second brake assist means includes a brake regulator mechanism that uses said increased first wheel cylinder pressure as a back pressure and adjusts said increased second wheel cylinder pressure to a pressure different by a predetermined value from said back pressure when said first and second brake assist means are activated.

2. A brake system according to claim 1, wherein:

said regulator mechanism includes a first chamber, which is supplied with said increased first wheel cylinder pressure of said first brake circuit as the back pressure, and a second chamber, which is supplied with said master cylinder pressure in said second chamber of said master cylinder and is communicated to said third and fourth wheel cylinders in said second brake circuit; and said first chamber and said second chamber of said regulator mechanism are fluid-tightly separated from each other by a piston having a regulator valve element that, after said increased second wheel cylinder pressure exceeds the pressure by the predetermined valve from the back pressure, allows a communication between said master cylinder and said third and fourth wheel cylinders in said second brake circuit so that said increased second wheel cylinder pressure is partly released to said master cylinder and prevented from further increasing and, before said increased second wheel cylinder pressure exceeds the pressure different by the predetermined value from the back pressure, blocks the communication between said master cylinder and said third and fourth wheel cylinders in said second brake circuit so that said increased second wheel cylinder pressure is not released to said master cylinder and continues to increase.

3. A brake system for a vehicle comprising:

a master cylinder having first and second chambers in each of which a master cylinder pressure is generated in response to brake operation by a vehicle driver;

first and second wheel cylinders for exerting a first braking force on first and second vehicle wheels, respectively, by a first wheel cylinder pressure generated based on said master cylinder pressure in said first chamber of said master cylinder;

a first brake circuit for connecting said master cylinder to said first and second wheel cylinders;

third and fourth wheel cylinders for exerting a second braking force on third and fourth vehicle wheels, respectively, by a second wheel cylinder pressure generated based on said master cylinder pressure in said second chamber of said master cylinder;

a second brake circuit for connecting said master cylinder to said third and fourth wheel cylinders;

first brake assist means arranged in said first brake circuit to increase said first wheel cylinder pressure to a level higher than said master cylinder pressure in said first chamber and to conduct said increased first wheel cylinder pressure to at least one of said first and second wheel cylinders in response to at least one of a state of said brake operation by said vehicle driver and a braking state of said vehicle; and second brake assist means arranged in said second brake circuit to increase said second wheel cylinder pressure to a level higher than said master cylinder pressure in said second chamber and to conduct said increased second wheel cylinder pressure to at least one of said third and fourth wheel cylinders in response to at least one of said state of said brake operation by said vehicle driver and said braking state of said vehicle, wherein said second brake assist means includes a brake regulator mechanism that uses said increased first wheel cylinder pressure as a pilot pressure and adjusts said increased second wheel cylinder pressure as a pilot pressure and adjusts said increased second wheel cylinder pressure in said third and fourth wheel cylinders to a pressure falling within a predetermined range from said increased first wheel cylinder pressure in said first and second wheel cylinders when said first brake assist means is activated;

said regulator mechanism includes a first chamber, which is supplied with said increased first wheel cylinder pressure of said first brake circuit as a back pressure, and a second chamber, which is supplied with said master cylinder pressure in said second chamber of said master cylinder and is communicated to said third and fourth wheel cylinders in said second brake circuit; and said first chamber and said second chamber of said regulator mechanism are fluid-tightly separated from each other by a piston having a regulator valve element that communicates or blocks between said master cylinder and said third and fourth wheel cylinders in said second brake circuit in response to a differential pressure between said back pressure and said increased second wheel cylinder pressure of said second brake circuit; and said piston has a first pressure receiving surface disposed to said first chamber of said regulator mechanism and a second pressure receiving surface disposed to said second chamber of said regulator mechanism, wherein there is provided a difference in surface area between said first pressure receiving surface and said second pressure receiving surface.

4. A brake system according to claim 3, wherein:

one of said first and second brake circuits is arranged to apply said first braking force to vehicle rear wheels, and the other of said first and second brake circuits is arranged to apply said second braking force to vehicle front wheels; and one of said first and second pressure receiving surfaces of said piston, which is in fluid communication with said one of said first and second brake circuits arranged to apply said first braking force to said vehicle rear wheels, is larger than the other of said first and second pressure receiving surfaces of said piston, which is in fluid communication with said other of said first and second brake circuits arranged to apply said second braking force to said vehicle front wheels.

5. A brake system according to claim 2, wherein said piston has seal means extending along an outer peripheral surface of said piston for fluid-tightly sealing between said first chamber and said second chamber of said regulator mechanism.

6. A brake system according to claim 5, wherein said piston is in an initial position while said vehicle driver is not conducting said brake operation, wherein said piston is urged to return to said initial position by a restoring force of said seal means after said seal means is deformed due to movement of said piston away from said initial position.

7. A brake system according to claim 5, wherein said piston is in an initial position while said vehicle driver is not conducting said brake operation, wherein said regulator mechanism has spring means for urging said piston to said initial position.

8. A brake system for a vehicle comprising:

a master cylinder having first and second chambers in each of which a master cylinder pressure is generated in response to brake operation by a vehicle driver;

first and second wheel cylinders for exerting a first braking force on first and second vehicle wheels, respectively, by a first wheel cylinder pressure generated based on said master cylinder pressure in said first chamber of said master cylinder;

a first brake circuit for connecting said master cylinder to said first and second wheel cylinders;

third and fourth wheel cylinders for exerting a second braking force on third and fourth vehicle wheels, respectively, by a second wheel cylinder pressure generated based on said master cylinder pressure in said second chamber of said master cylinder;

a second brake circuit for connecting said master cylinder to said third and fourth wheel cylinders;

first brake assist means arranged in said first brake circuit to increase said first wheel cylinder pressure to a level higher than said master cylinder pressure in said first chamber and to conduct said increased first wheel cylinder pressure to at least one of said first and second wheel cylinders in response to at least one of a state of said brake operation by said vehicle driver and a braking state of said vehicle;

second brake assist means arranged in said second brake circuit to increase said second wheel cylinder pressure to a level higher than said master cylinder pressure in said second chamber and to conduct said increased second wheel cylinder pressure to at least one of said third and fourth wheel cylinders in response to at least one of said state of said brake operation by said vehicle driver and said braking state of said vehicle, wherein said second brake assist means includes a brake regulator mechanism that uses said increased first wheel cylinder pressure as a pilot pressure and adjusts said increased second wheel cylinder pressure as a pilot pressure and adjusts said increased second wheel cylinder pressure in said third and fourth wheel cylinders to a pressure falling within a predetermined range from said increased first wheel cylinder pressure in said first and second wheel cylinders when said first brake assist means is activated; and said regulator mechanism includes a first chamber, which is supplied with said increased first wheel cylinder pressure of said first brake circuit as a back pressure, and a second chamber, which is supplied with said master cylinder pressure in said second chamber of said master cylinder and is communicated to said third and fourth wheel cylinders in said second brake circuit; and said first chamber and said second chamber of said regulator mechanism are fluid-tightly separated from each other by a piston having a regulator valve element that communicates or blocks between said master cylinder and said third and fourth wheel cylinders in said second brake circuit in response to a differential pressure between said back pressure and said increased second wheel cylinder pressure of said second brake circuit; and said piston has seal means extending along an outer peripheral surface of said piston for fluid-tightly sealing between said first chamber and said second chamber of said regulator mechanism; and said seal means includes first and second seal elements extending along said outer peripheral surface of said piston, wherein said first and second seal elements are arranged in series between said first chamber and said second chamber of said regulator mechanism.

9. A brake system according to claim 8, wherein a space between said first seal element and said second seal element is in fluid communication with a communication passage to atmosphere for allowing part of said brake fluid leaked into said space between said first seal element and said second seal element to egress through said communication passage.

10. A brake system for a vehicle comprising:

a master cylinder having first and second chambers in each of which a master cylinder pressure is generated in response to brake operation by a vehicle driver;

first and second wheel cylinders for exerting a first braking force on first and second vehicle wheels, respectively, by a first wheel cylinder pressure generated based on said master cylinder pressure in said first chamber of said master cylinder;

a first brake circuit for connecting said master cylinder to said first and second wheel cylinders;

third and fourth wheel cylinders for exerting a second braking force on third and fourth vehicle wheels, respectively, by a second wheel cylinder pressure generated based on said master cylinder pressure in said second chamber of said master cylinder;

a second brake circuit for connecting said master cylinder to said third and fourth wheel cylinders;

first brake assist means arranged in said first brake circuit to increase said first wheel cylinder pressure to a level higher than said master cylinder pressure in said first chamber and to conduct said increased first wheel cylinder pressure to at least one of said first and second wheel cylinders in response to at least one of a state of said brake operation by said vehicle driver and a braking state of said vehicle;

second brake assist means arranged in said second brake circuit to increase said second wheel cylinder pressure to a level higher than said master cylinder pressure in said second chamber and to conduct said increased second wheel cylinder pressure to at least one of said third and fourth wheel cylinders in response to at least one of said state of said brake operation by said vehicle driver and said braking state of said vehicle, wherein said second brake assist means includes a brake regulator mechanism that uses said increased first wheel cylinder pressure as a pilot pressure and adjusts said increased second wheel cylinder pressure as a pilot pressure and adjusts said increased second wheel cylinder pressure in said third and fourth wheel cylinders to a pressure falling within a predetermined range from said increased first wheel cylinder pressure in said first and second wheel cylinders when said first brake assist means is activated; and said regulator mechanism includes a first chamber, which is supplied with said increased first wheel cylinder pressure of said first brake circuit as a back pressure, and a second chamber, which is supplied with said master cylinder pressure in said second chamber of said master cylinder and is communicated to said third and fourth wheel cylinders in said second brake circuit; and said first chamber and said second chamber of said regulator mechanism are fluid-tightly separated from each other by a piston having a regulator valve element that communicates or blocks between said master cylinder and said third and fourth wheel cylinders in said second brake circuit in response to a differential pressure between said back pressure and said increased second wheel cylinder pressure of said second brake circuit; and said first and second brake circuits and said regulator mechanism are arranged in a housing, wherein said piston slides along an inner side-wall surface of a recess defined in said housing.

11. A brake system according to claim 10, wherein:

said regulator mechanism has a seat valve unit having a valve seat provided for engaging with said regulator valve element and also has a guide for securing said seat valve unit to said housing;

Said inner side-wall surface of said recess of said housing is provided with a first port passage in fluid communication with said master cylinder and a second port passage in fluid communication with said third and fourth wheel cylinders, wherein said first port passage is arranged closer to an entry opening of said recess of said housing than said second port passage; and an outer peripheral portion and a distal end portion of said guide are caulked to said housing, wherein said caulking between said outer peripheral portion of said guide and said housing secures said guide to said housing and also seals between said first port passage and an exterior of said housing, and said caulking between said distal end portion of said guide and said housing seals between said first port passage and said second port passage around said guide.

12. A brake system according to claim 11, wherein said seat valve unit has a check valve that allows flow of said brake fluid only in a direction from said first port passage to said second port passage.

13. A brake system according to claim 12, wherein:

said seat valve unit has a check valve seat of said check valve and a check valve element of said check valve;

said inner side-wall surface of said recess of said housing is provided with a filter covering said second port passage; and said filter is positioned adjacent to said seat valve unit, wherein said filter acts as a mechanical stopper for said check valve element and also acts as a shaft support holder for said regulator valve element.

14. A brake system for a vehicle comprising:

a master cylinder having first and second chambers in each of which a master cylinder pressure is generated in response to brake operation by a vehicle driver;

first and second wheel cylinders for exerting a first braking force on first and second vehicle wheels, respectively, by a first wheel cylinder pressure generated based on said master cylinder pressure in said first chamber of said master cylinder;

a first brake circuit for connecting said master cylinder to said first and second wheel cylinders;

third and fourth wheel cylinders for exerting a second braking force on third and fourth vehicle wheels, respectively, by a second wheel cylinder pressure generated based on said master cylinder pressure in said second chamber of said master cylinder;

a second brake circuit for connecting said master cylinder to said third and fourth wheel cylinders;

first brake assist means arranged in said first brake circuit to increase said first wheel cylinder pressure to a level higher than said master cylinder pressure in said first chamber and to conduct said increased first wheel cylinder pressure to at least one of said first and second wheel cylinders in response to at least one of a state of said brake operation by said vehicle driver and a braking state of said vehicle;

second brake assist means arranged in said second brake circuit to increase said second wheel cylinder pressure to a level higher than said master cylinder pressure in said second chamber and to conduct said increased second wheel cylinder pressure to at least one of said third and fourth wheel cylinders in response to at least one of said state of said brake operation by said vehicle driver and said braking state of said vehicle, wherein said second brake assist means includes a brake regulator mechanism that uses said increased first wheel cylinder pressure as a pilot pressure and adjusts said increased second wheel cylinder pressure as a pilot pressure and adjusts said increased second wheel cylinder pressure in said third and fourth wheel cylinders to a pressure falling within a predetermined range from said increased first wheel cylinder pressure in said first and second wheel cylinders when said first brake assist means is activated; and a differential pressure measurement mechanism for measuring a differential pressure between said increased first wheel cylinder pressure in said first brake circuit and said increased second wheel cylinder pressure of said second brake circuit, wherein if said differential pressure measured with said differential pressure measurement mechanism is equal to or greater than a predetermined amount, at least one of a plurality of countermeasures is taken, wherein said plurality of countermeasures include giving a warning or notification to said vehicle driver; interrupting or prohibiting operation of said first and second brake assist means; and reducing said increased first wheel cylinder pressure in said first brake circuit.

15. A brake system for a vehicle comprising:

a master cylinder having first and second chambers in each of which a master cylinder pressure is generated in response to brake operation by a vehicle driver;

first and second wheel cylinders for exerting a first braking force on first and second vehicle wheels, respectively, by a first wheel cylinder pressure generated based on said master cylinder pressure in said first chamber of said master cylinder;

a first brake circuit for connecting said master cylinder to said first and second wheel cylinders;

third and fourth wheel cylinders for exerting a second braking force on third and fourth vehicle wheels, respectively, by a second wheel cylinder pressure generated based on said master cylinder pressure in said second chamber of said master cylinder;

a second brake circuit for connecting said master cylinder to said third and fourth wheel cylinders;

first brake assist means arranged in said first brake circuit to increase said first wheel cylinder pressure to a level higher than said master cylinder pressure in said first chamber and to conduct said increased first wheel cylinder pressure to at least one of said first and second wheel cylinders in response to at least one of a state of said brake operation by said vehicle driver and a braking state of said vehicle;

second brake assist means arranged in said second brake circuit to increase said second wheel cylinder pressure to a level higher than said master cylinder pressure in said second chamber and to conduct said increased second wheel cylinder pressure to at least one of said third and fourth wheel cylinders in response to at least one of said state of said brake operation by said vehicle driver and said braking state of said vehicle, wherein said second brake assist means includes a brake regulator mechanism that uses said increased first wheel cylinder pressure as a pilot pressure and adjusts said increased second wheel cylinder pressure in said third and fourth wheel cylinders to a pressure falling within a predetermined range from said increased first wheel cylinder pressure in said first and second wheel cylinders when said first brake assist means is activated; and a first hydraulic pressure sensor for measuring said increased first wheel cylinder pressure in said first brake circuit and a second hydraulic pressure sensor for measuring said increased second wheel cylinder pressure of said second brake circuit, wherein if a differential pressure that is equal to or greater than a predetermined amount is developed between a measured pressure value of said first hydraulic pressure sensor and a measured pressure value of said second hydraulic pressure sensor, at least one of a plurality of countermeasures is taken, wherein said plurality of countermeasures include giving a warning or notification to said vehicle driver; interrupting or prohibiting operation of said first and second brake assist means; and reducing said increased first wheel cylinder pressure in said first brake circuit.

16. A brake system for a vehicle comprising:

a master cylinder having first and second chambers in each of which a master cylinder pressure is generated in response to brake operation by a vehicle driver;

first and second wheel cylinders for exerting a first braking force on first and second vehicle wheels, respectively, by a first wheel cylinder pressure generated based on said master cylinder pressure in said first chamber of said master cylinder;

a first brake circuit for connecting said master cylinder to said first and second wheel cylinders;

third and fourth wheel cylinders for exerting a second braking force on third and fourth vehicle wheels, respectively, by a second wheel cylinder pressure generated based on said master cylinder pressure in said second chamber of said master cylinder;

a second brake circuit for connecting said master cylinder to said third and fourth wheel cylinders;

first brake assist means arranged in said first brake circuit to increase said first wheel cylinder pressure to a level higher than said master cylinder pressure in said first chamber and to conduct said increased first wheel cylinder pressure to at least one of said first and second wheel cylinders in response to at least one of a state of said brake operation by said vehicle driver and a braking state of said vehicle;

second brake assist means arranged in said second brake circuit to increase said second wheel cylinder pressure to a level higher than said master cylinder pressure in said second chamber and to conduct said increased second wheel cylinder pressure to at least one of said third and fourth wheel cylinders in response to at least one of said state of said brake operation by said vehicle driver and said braking state of said vehicle, wherein said second brake assist means includes a brake regulator mechanism that uses said increased first wheel cylinder pressure as a pilot pressure and adjusts said increased second wheel cylinder pressure in said third and fourth wheel cylinders to a pressure falling within a predetermined range from said increased first wheel cylinder pressure in said first and second wheel cylinders when said first brake assist means is activated; and a differential pressure measurement pipeline and a differential pressure switch that is inserted in said differential pressure measurement pipeline and is activated by a predetermined amount of differential pressure developed in said differential pressure measurement pipeline; wherein:

said differential pressure measurement pipeline is extended out from anywhere where said increased first wheel cylinder pressure is supplied in said first brake circuit to anywhere where said increased second wheel cylinder pressure is supplied in said second brake circuit; and if said predetermined differential pressure is developed in said differential pressure measurement pipeline, and thereby said differential pressure switch is activated, at least one of a plurality of countermeasures is taken, wherein said plurality of countermeasures include giving a warning or notification to said vehicle driver; interrupting or prohibiting operation of said first and second brake assist means; and reducing said increased first wheel cylinder pressure in said first brake circuit.

17. A brake system according to claim 1, further comprising a check valve disposed in said second brake circuit in parallel with said regulator mechanism for allowing flow of said brake fluid only in a direction from said master cylinder to said third and fourth wheel cylinders.

18. A brake system according to claim 1, wherein said regulator mechanism includes a check valve mechanism that allows flow of said brake fluid only in a direction from said master cylinder to said third and fourth wheel cylinders.

* * * * *